(12) United States Patent
Owen et al.

(10) Patent No.: US 7,780,080 B2
(45) Date of Patent: *Aug. 24, 2010

(54) PORTABLE DEVICE AND METHODS FOR PERFORMING SECURE TRANSACTIONS

(75) Inventors: Kelly Owen, Los Alamitos, CA (US); Paul Anthony Howell, Huntington Beach, CA (US)

(73) Assignee: EncryptaKey, Inc., Cypress, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/738,956

(22) Filed: Apr. 23, 2007

(65) Prior Publication Data

US 2007/0257104 A1 Nov. 8, 2007

Related U.S. Application Data

(60) Provisional application No. 60/745,514, filed on Apr. 24, 2006, provisional application No. 60/859,168, filed on Nov. 15, 2006.

(51) Int. Cl.
*G06K 5/00* (2006.01)
(52) U.S. Cl. .................... 235/382; 235/375; 235/380; 235/451; 235/487; 235/492; 705/64; 705/65; 705/66; 705/67; 382/115; 711/147; 711/150
(58) Field of Classification Search ............ 235/375, 235/380, 382, 382.5, 451, 492, 487; 705/64–67; 711/147, 150
See application file for complete search history.

(56) References Cited

U.S. PATENT DOCUMENTS 6,886,741 B1 * 5/2005 Salveson ............... 235/375

7,480,637 B2 * 1/2009 Kozlay .................. 705/67

(Continued)

FOREIGN PATENT DOCUMENTS

DE 20 2004 008 697 U1 10/2004

(Continued)

OTHER PUBLICATIONS

Yoggie Security Systems, Ltd.; Yoggie Pico—Protect Your Laptop from Malicious Code; Printed from http://www.yoggie.com/howItWorks.shtml on Aug. 28, 2007, 3 pages.

(Continued)

*Primary Examiner*—Thien Minh Le
*Assistant Examiner*—Tuyen K Vo
(74) *Attorney, Agent, or Firm*—Knobbe Martens Olson & Bear, LLP

(57) ABSTRACT

A portable, biometrically-secured device for facilitating various different types of in-person and online transactions. For example, the portable, biometrically-secured device can be used to safely perform in-person financial transactions, such as credit card transactions, in which the user's identity is biometrically authenticated. The portable, biometrically-secured device can also be used for performing biometrically-secured online transactions. For example, the portable, biometrically-secured device can be used to create a secure platform from which to make the online transactions by loading a secure operating system from the device to a host computer's volatile memory. Biometrically-secured online transactions can then be performed using the host computer. In one embodiment, the portable, biometrically-secured device facilitates online financial transactions that can be performed without transmitting a user's financial information to the online merchant.

20 Claims, 15 Drawing Sheets

U.S. PATENT DOCUMENTS

| | | | |
|---|---|---|---|
| 2004/0128249 A1* | 7/2004 | Hoffman | 705/44 |
| 2004/0129787 A1 | 7/2004 | Saito et al. | |
| 2004/0172427 A1 | 9/2004 | Thomas et al. | |
| 2005/0005076 A1 | 1/2005 | Lasser | |
| 2005/0036666 A1 | 2/2005 | Wang et al. | |
| 2006/0085357 A1* | 4/2006 | Pizarro | 705/64 |
| 2006/0091223 A1* | 5/2006 | Zellner et al. | 235/492 |

FOREIGN PATENT DOCUMENTS

| | | | |
|---|---|---|---|
| KR | 2005 0034506 A | | 4/2005 |
| WO | WO 98/38567 | | 9/1998 |
| WO | WO 01/57784 | A1 | 8/2001 |
| WO | WO 2004/066132 | A1 | 8/2004 |
| WO | WO 2004/088515 | A1 | 10/2004 |

OTHER PUBLICATIONS

Yoggie Security Systems, Ltd.; Yoggie Pico User Guide; Printed from http://www.yoggie.com/PDF/Pico%20User%20Guide.pdf on Aug. 20, 2007, 44 pages.

U3 LLC; Bring the power of portable software to your USB flash drive—make it a U3 smart drive!; Printed from http://www.u3.com/smart/default.aspx on Aug. 20, 2007, 1 page.

Privaris, Inc.; Privaris—Biometric Security—PlusID; Printed from http://www.privaris.com/products/index.html on Aug. 20, 2007, 2 pages.

Privaris, Inc.; Privaris; Printed from http://www.privaris.com/biometric_applications.html on Aug. 20, 2007, 2 pages.

EISST Ltd.; Products—EISST; Printed from http://www.eisst.com/products/ on Aug. 20, 2007, 2 pages.

EISST Ltd.; e-Capsule Private Safe—Data Protection, File Encryption and Secure Document Management— EISST; Printed from http://www.eisst.com/products/private_safe on Aug. 20, 2007, 2 pages.

EISST Ltd.; e-Capsule Private Mail—Secure Email Software for Ultimate Email Security—EISST; Printed from http://www.eisst.com/products/private_mail/ on Aug. 20, 2007, 2 pages.

EISST Ltd.; e-Capsule Private Browser—Protected and Anonymous Web Surfing for Laptops and Desktops— EISST; Printed from http://www.eist.com/products/private_browser/ on Aug. 20, 2007, 1 page.

MXI Security; Stealth MXP Family; Printed from http://www.mxisecurity.com/docs/mxi_stealth_mxp.pdf on Aug. 20, 2007, 12 pages.

MXI Security; Outbacker MXP; Printed from http://www.mxisecurity.com/docs/mxi_outbacker_mxp.pdf on Aug. 31, 2007, 2 pages.

MXI Security; ClipDrive; Printed from http://www.mxisecurity.com/docs/mxi_clipdrive.pdf on Aug. 31, 2007, 2 pages.

U.S. Appl. No. 11/739,003, Owen et al.

U.S. Appl. No. 11/738,954, Owen et al.

U.S. Appl. No. 11/738,028, Owen et al.

U.S. Appl. No. 11/738,976, Owen et al.

U.S. Appl. No. 11/738,964, Owen et al.

Golem.De, "U3: Programme direkt vom USB-Stick starten," retrieved from the Internet at <http//www.golem.de/print.php?a=40511> on Nov. 10, 2007, 2 pages.

Partial International Search Results, mailed Nov. 2, 2007, International Application No. PCT/US2007/009901, 2 pages.

Caceres, R. et al., "Reincarnating PCs with Portable SoulPads," MobiSys '05: The Third International Conference on Mobile Systems, Applications and Services, USENIX Association, XP-002413100, pp. 65-78.

* cited by examiner

PORTABLE DEVICE AND METHODS FOR PERFORMING SECURE TRANSACTIONS

RELATED APPLICATIONS

This application claims priority to the following U.S. provisional patent applications, each of which is hereby incorporated herein by reference in their entirety to be considered part of this specification: U.S. Provisional Patent Application No. 60/745,514, filed Apr. 24, 2006, and entitled "INVISIDESK PRIVATE COMMUNICATION, AUTHENTICATION AND CONNECTION PORTAL"; and U.S. Provisional Patent Application No. 60/859,168, filed Nov. 15, 2006, and entitled "SYSTEMS AND METHODS FOR PERFORMING SECURE ONLINE CREDIT CARD TRANSACTIONS."

The present application is also related to the following applications filed on even date herewith, each of which is hereby incorporated herein by reference in its entirety:

U.S. patent application Ser. No. 11/739,003, entitled "SYSTEMS AND METHODS FOR PERFORMING SECURE ONLINE TRANSACTIONS," published as U.S. Patent Application Publication No. 2008-0016005 A1;

U.S. patent application Ser. No. 11/738,954, entitled "SYSTEMS AND METHODS FOR PERFORMING SECURE IN-PERSON TRANSACTIONS," published as U.S. Patent Application Publication No. 2007-0282754 A1;

U.S. patent application Ser. No. 11/739,028, entitled "SYSTEMS AND METHODS FOR PERFORMING SECURE NETWORK COMMUNICATION," published as U.S. Patent Application Publication No. 2007-0280510 A1;

U.S. patent application Ser. No. 11/738,976, entitled "SYSTEMS AND METHODS FOR ESTABLISHING A SECURE COMPUTING ENVIRONMENT FOR PERFORMING ONLINE TRANSACTIONS," published as U.S. Patent Application Publication No. 2007-0257105 A1; and U.S. patent application Ser. No. 11/738,964, entitled "SYSTEMS AND METHODS FOR STORING DATA TO A HANDHELD DEVICE," published as U.S. Patent Application Publication No. 2007-0280509 A1.

BACKGROUND OF THE INVENTION

1. Field of the Invention

Embodiments of the invention generally relate to systems and methods for performing biometrically-secured transactions, including biometrically-secured communications and financial transactions.

2. Description of the Related Art

Due to the prevalence of financial fraud, identity theft, and related schemes, it has become increasingly difficult to safely and securely participate in certain online and in-person transactions. A user typically engages in online transactions using a host computer connected to the internet. However, in many cases the host computer contains malware, such as viruses, worms, spyware, key-logger programs, etc., which endangers the privacy of transactions performed using the host computer.

Even if the host computer is properly secured against such malware, many types of online transactions, such as online credit card purchases, currently require the user to divulge private information to online merchants. For example, when making an online purchase, a purchaser typically pays using a credit card. Not only are these transactions subject to fraud since there are few protections in place to ensure that the purchase is being made by an authorized party, but even in the case where the purchaser is an authorized user of the card, he typically must submit his credit card information to the online merchant. Often the purchaser will make purchases from several different online merchants, thus leading to the widespread dissemination of the purchaser's credit card information. Such widespread dissemination increases the probability that the purchaser's private information will be compromised due, for example, to a breach in the online merchant's computer system security. Moreover, the act of transmitting private information to the merchant creates the danger that the information could be intercepted by unauthorized parties over the internet.

In-person credit card transactions are also subject to security problems, such as fraud. As is the case with online credit card transactions, the transaction may be completed by an unauthorized possessor of the card. More recently, credit cards that include Radio Frequency Identification (RFID) tags have been made available. These credit cards can be used to complete touch-less in-person transactions that do not require the user to swipe his card past a magnetic reader or hand over the card to a cashier. Instead, the credit card information contained in the RFID tag on the card can be transmitted wirelessly when the card is brought in proximity to an RFID tag reader. While this type of credit card increases the convenience of the transaction, it also opens the possibility that a user's credit card information could be surreptitiously read by unauthorized RFID tag readers which may come in proximity to the card.

In addition to the problems described herein with respect to financial transactions, other types of transactions are also subject to concerns related to fraud and identify theft. For example, electronic person-to-person communications, such as email, chat rooms, instant messaging, and others, are also subject to fraud and identity theft. These communications are typically only secured, if at all, with a password. Thus, electronic communications can be accessed by unauthorized parties who are able to gain access to the intended recipient's communication account via a stolen password or some other method.

The problems described herein are not limited solely to financial transactions and electronic communications. A user's privacy, security, and identity can be jeopardized during tasks and activities that millions of people perform every day, whether in-person or remotely via their computers. Cumulatively, these acts of fraud cost society enormous sums of money.

SUMMARY OF THE INVENTION

In view of the foregoing, a need exists for devices, systems, and methods for facilitating in-person and online transactions in a safe and secure manner.

Embodiments of a handheld device for facilitating various different types of in-person and online transactions are disclosed herein. For example, the handheld device can comprise a portable, biometrically-secured device used to safely perform in-person financial transactions, such as credit card transactions, in which the user's identity is biometrically authenticated.

In certain embodiments, the portable, biometrically-secured device can also be used for performing biometrically-secured online transactions. For example, the portable, biometrically-secured device can be used to create a secure platform from which to make the online transactions by loading a secure operating system from the device to a host computer's volatile memory. Biometrically-secured online transactions can then be performed using the host computer. In some cases, the online transactions are performed via private computer network connections. The online transactions can include financial transactions and inter-personal electronic communications, for example.

In some embodiments a portable device is disclosed for facilitating secure transactions. The portable device comprises: an interface configured to couple to a host computer; a biometric sensor configured to receive identification information from a user; a memory configured to store transaction information and instructions for execution by the host computer; and a processor coupled to the memory and the biometric sensor, the processor being configured to authenticate the identification information and, upon authentication of the identification information, to cause the portable device to communicate the instructions to a volatile memory of the host computer to independently control operations of the host computer, the instructions being configured to use the transaction information during the performance of a transaction with a second computer coupled via a network to the host computer.

In some embodiments a method is disclosed for performing a secure transaction. The method comprises: establishing communication between a host computer and a handheld device; receiving with the handheld device biometric information from a user; determining whether the biometric information corresponds to an approved biometric signature; loading operating system instructions from the handheld device to a volatile memory of the host computer when the biometric information corresponds to the approved biometric signature; and performing an online transaction with a second computer communicatively coupled via a network to the host computer while the host computer is operating under the control of the operating system instructions loaded from the handheld device.

In some embodiments a portable device is disclosed for facilitating secure transactions. The portable device comprises: means for communicating with a host computer; means for storing transaction information and operating system instructions for execution on the host computer; means for receiving biometric information from a user; means for authenticating the biometric information and for loading the operating system instructions from said means for storing to the host computer upon said authentication; and means for performing a transaction with a second computer communicatively coupled to the host computer via a network while the host computer is operating under the control of the operating system instructions loaded from said means for storing.

In some embodiments a system is disclosed for performing secure online financial transactions. The system comprises: a portable device comprising a biometric sensor configured to receive user identification information, a memory configured to store user financial information, and a processor coupled to the memory and the biometric sensor, the processor being configured to authenticate the user identification information; a host computer coupled to the portable device; and a transaction server in communication with the host computer and a merchant module via a network, the transaction server being configured to receive user purchase information from the merchant module, the user purchase information being indicative of a user-selected item for purchase, receive the user financial information via the host computer after the user identification information is successfully authenticated, and transmit the user purchase information and the user financial information to a financial processor module for confirmation of sufficient funds related to the user financial information.

In some embodiments a method is disclosed for performing an online financial transaction. The method comprises: receiving, with a transaction module, purchase information from a merchant over a network, the purchase information being indicative of user input as to a desired purchase; receiving biometric information from a user; authenticating the biometric information; receiving, with the transaction module, user financial information over the network after said authentication; and transmitting with the transaction module the user financial information and the purchase information to a financial processor.

In some embodiments a system is disclosed for performing secure online financial transactions. The system comprises: means for receiving purchase information via a network from a merchant, the purchase information being sent by the merchant in response to user input as to a desired purchase; means for receiving user biometric information; means for authenticating the biometric information; means for receiving user financial information over the network upon successful authentication of the biometric information; and means for transmitting the user financial information and the purchase information to a financial processor.

In some embodiments a handheld device is disclosed for facilitating secure transactions. The handheld device comprises: rewritable radio frequency identification (RFID) circuitry; a biometric sensor configured to receive user identification information; a memory configured to store transaction information; a processor coupled to the memory and the biometric sensor, the processor being configured to authenticate the user identification information and to temporarily write the transaction information to the rewritable RFID circuitry upon authentication of the user identification information, the transaction information being readable from the RFID circuitry by an external reader.

In some embodiments a method is disclosed for performing a secure transaction. The method comprises: receiving biometric information from a user; determining whether the biometric information corresponds to a stored biometric signature; writing transaction information to a rewritable radio frequency identification (RFID) tag when the biometric information corresponds to the stored biometric signature; transmitting the transaction information; and removing the transaction information from the rewritable RFID tag after transmitting the transaction information.

In some embodiments a portable device is disclosed for facilitating secure transactions. The portable device comprises: means for receiving biometric information from a user; means for determining whether the biometric information corresponds to a selected biometric signature; means for temporarily writing transaction information to a reconfigurable radio frequency identification (RFID) tag when the biometric information corresponds to the selected biometric signature; and means for removing the transaction information from the RFID tag after the transaction information has been queried by a reader.

In some embodiments a system is disclosed for performing secure electronic person-to-person communications. The system comprises: a handheld device comprising an interface configured to couple to a host computer, a biometric sensor configured to receive biometric information from a user, a memory configured to store operating system instructions for execution by the host computer, and a processor coupled to the memory and the biometric sensor, the processor being configured to load the operating system instructions to the host computer for controlling the operation thereof; and a server coupled to the host computer via a network, the server configured to receive an electronic message from a remote computer, the electronic message including identification information of an intended recipient, receive the biometric information from the handheld device via the host computer, compare the biometric information of the user with the identification information of the intended recipient to determine if the user is the intended recipient, and grant the user access to the electronic message after a determination that the user is the intended recipient.

In some embodiments a method is disclosed for performing secure electronic person-to-person communications. The method comprises: receiving an electronic message via a network, the electronic message being associated with an identification of an intended recipient; receiving, from a host computer coupled to the network, a request by a user to access the electronic message; receiving through a portable device coupled to the host computer biometric information of the user; electronically authenticating the biometric information to determine whether the user is the intended recipient; and granting the user access to the electronic message after said authentication.

In some embodiments a system is disclosed for performing secure network communication. The system comprises: means for receiving an electronic message via a network, the electronic message being associated with an identification of an intended recipient; means for receiving, from a host computer coupled to the network, a request by a user to access the electronic message; means for receiving biometric information of the user, said means for receiving biometric information being coupled to the host computer; means for electronically authenticating the biometric information to determine whether the user is the intended recipient; and means granting the user access to the electronic message after said authentication.

In some embodiments a system is disclosed for establishing a secure computing environment for performing online transactions. The system comprises: a host computer; and a handheld device comprising an interface configured to couple to the host computer, a biometric sensor configured to receive user identification information, operating system instructions for execution by the host computer during the performance of one or more secure online transactions, a memory configured to store the operating system instructions, and a processor in communication with the memory and the biometric sensor, the processor configured to authenticate the user identification information and to communicate the operating system instructions to the host computer after authentication of the user identification information in order to perform the one or more secure online transactions.

In some embodiments a method is disclosed for establishing a secure computing platform from which to perform transactions. The method comprises: establishing a connection between a handheld device and a host computer, the host computer having a first operating system; receiving biometric information with the portable device; authenticating the biometric information; loading operating system instructions from the handheld device to the host computer after said authenticating, wherein said loading causes the host computer to execute the operating system instructions in place of the first operating system during the performance of one or more network transactions.

In some embodiments a handheld device is disclosed for facilitating secure transactions. The portable device comprises: means for communicating with a host computer having a first operating system; means for storing operating system instructions; means for receiving biometric information from a user; means for determining whether the biometric information corresponds to a selected biometric signature; and means for loading the operating system instructions to a volatile memory of the host computer when the biometric information corresponds to the selected biometric signature, the operating system instructions being configured to independently control the host computer during the performance of an online transaction so as to prevent the host computer from loading the first operating system and from accessing non-volatile memory of the host computer.

In some embodiments a system is disclosed for storing data on a handheld device. The system comprises: a handheld device comprising an interface configured to couple to a host computer, a biometric sensor configured to receive biometric information from a user, a memory configured to store operating system instructions for execution by the host computer, and a processor coupled to the memory and the biometric sensor, the processor being configured to load the operating system instructions to the host computer for controlling the operation thereof; one or more storage devices configured to store user data; and a server coupled to the host computer via a network, the server configured to receive the biometric information from the handheld device via the host computer, the host computer operating under the control of the operating system instructions, authenticate the biometric information, and access and transmit the user data to the handheld device upon authentication of the biometric information.

In some embodiments a method is disclosed for storing data on a handheld device. The method comprises: receiving biometric information of a user over a network from a host computer in communication with the first handheld device, the host computer operating under the control of operating system instructions loaded to the host computer from the first handheld device; authenticating the biometric information; and transmitting user data over the network to the first handheld device via the host computer if the biometric information is successfully authenticated.

In some embodiments a system is disclosed for storing data on a handheld device. The system comprises: means for receiving biometric information over a network from a host computer in communication with the first handheld device, the host computer operating under the control of operating system instructions loaded to the host computer from the first handheld device; means for authenticating the biometric information; and means for transmitting user data over the network to the first handheld device via the host computer if the biometric information is successfully authenticated.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Figure 1:
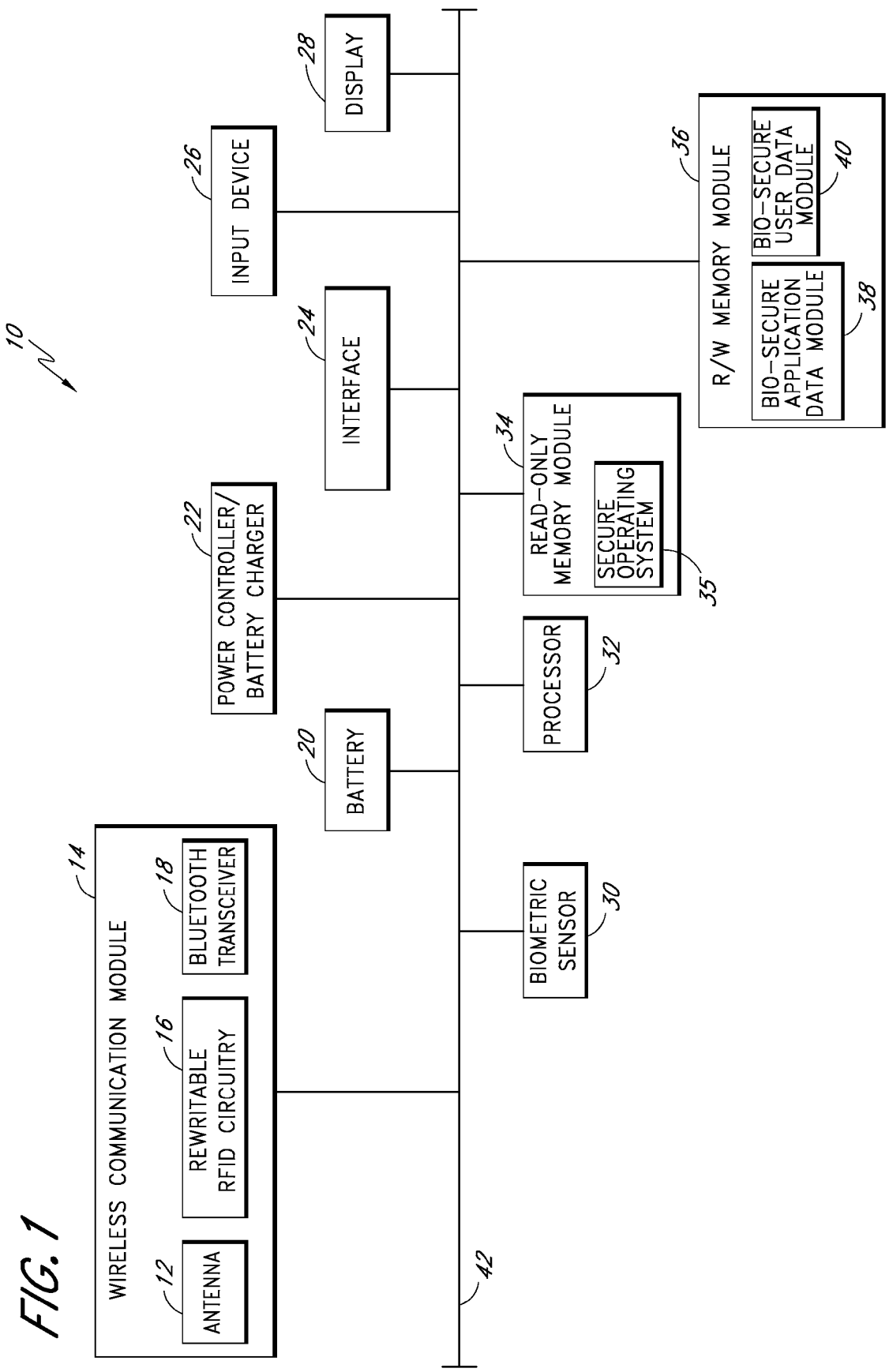
FIG. 1 is a block diagram of a portable biometrically-secured device for facilitating biometrically-secured in-person and/or online transactions, according to certain embodiments of the invention.

Devices, systems, and methods for performing biometrically-secured in-person and online transactions using a biometrically-secured device are disclosed. Various types of transactions are supported, including financial transactions as well as electronic person-to-person communications, such as sending and receiving emails. Other supported transactions include the transmission of entry codes for buildings or vehicles, for example, and the act of accessing electronic files from a remote computer or data storage device.

In certain embodiments, the biometrically-secured device is a portable device similar in appearance to a flash drive (e.g., a "jump drive" or a "thumb drive"). In some embodiments, the portable device includes a biometric sensor for performing biometric identity authentication of a user. Once the identity of a user has been biometrically authenticated, embodiments of the device can be used to complete a transaction involving a party whose identity is a desirable factor in the success or completion of the transaction.

For example, if a user wishes to make a purchase (e.g., an in-person credit card purchase), the device may require the user to biometrically authenticate his identity, after which the device will facilitate the completion of the purchase by, for example, using financial information stored within the device. The biometrically-secured device can also be used to require a user to biometrically authenticate his identity before facilitating many other types of transactions, as described herein.

In the case of some online transactions, the portable, biometrically-secured device interfaces with a host computer (e.g., via a USB port) to create a secure computing platform from which to perform online transactions. For example, the device can be used to boot a host computer with a secure operating system stored on the device that helps to diminish the probability that the user's private information that is exchanged during an online transaction will be compromised. The secure operating system enhances the security of online transactions performed using the host computer by helping to protect a user's private information against malware or other security threats that may exist on the host computer and that would otherwise endanger the security of transactions performed using the host computer.

In some embodiments, the secure operating system helps protect a user's private information against malware by not accessing the host computer's hard disk drive (HDD), which is typically the source of such malware. For example, the secure operating system can be loaded to the host computer's volatile, or temporary, memory (e.g., RAM) from the portable biometrically-secured device. Once loaded, the secure operating system can operate within the host computer's volatile memory, substantially without accessing data from, or storing data to, the computer's non-volatile memory, such as the HDD. Since the secure operating system does not substantially access the HDD, many, if not all, of the security threats from malware stored on the HDD are foregone. For example, if a key-logger program capable of monitoring a user's keystrokes and transmitting them to an unauthorized party were to be installed on the host computer, the secure operating can substantially disable the key-logger program by not accessing the HDD where it resides, thus not allowing it the opportunity to execute.

In some embodiments, the data needed to complete an online transaction is stored in the portable, biometrically-secured device itself without relying on the host computer's HDD. Moreover, data resulting from the online transaction is stored to the portable device rather than to the host computer. After each usage, the computer's volatile memory can be erased without leaving the types of trace information that may still remain in non-volatile memory even after the information is deleted or otherwise "erased." This process has the benefit of allowing for the completion of online transactions without leaving information associated with the transactions that have been performed under the operation of the secure operating system on the host computer.

In some embodiments, the secure operating system causes the host computer to create a private connection (e.g., an encrypted Virtual Private Network (VPN) connection) to a secure internet portal. In one embodiment, the secure internet portal is a computer server that facilitates various transactions described herein and can act as a conduit for communications between the host computer and various other remote computers. For instance, in certain embodiments, the portal comprises an ORACLE server, an EXCHANGE server, or the like. In certain embodiments, the portal comprises a plurality of servers.

Online transactions such as purchases from online merchants, accessing messages or files, combinations of the same, or the like can then be facilitated via the secure internet portal. For example, the secure internet portal can host biometrically-secured electronic communications services, such as email, chat rooms, voice messaging (e.g., Voice Over IP (VOIP) telephone calls), instant or real-time messaging, combinations of the same, or the like, as well as facilitating access to electronic files on remote computers.

The secure internet portal can also facilitate financial transactions with online merchants without requiring the exchange of confidential financial information between a purchaser and the merchant, thus avoiding the widespread dissemination of the purchaser's financial information along with the dangers that accompany such dissemination. In the case of each of these transactions, the device can be used to biometrically authenticate the identity of one or more parties involved in the transaction, thus decreasing the possibility of a fraudulent transaction.

In addition to the online transactions facilitated by the portable device, it can also facilitate in-person transactions. For example, the portable device can include an active or passive transmitter, such as an RFID tag to send, whether wirelessly or not, transaction information to another device, such as a point-of-sale terminal or an RFID tag reader. In some embodiments, the RFID tag is rewritable so that it can be programmed for use in many different types of transactions.

For example, the rewritable RFID tag can be programmed for use in a credit card transaction, a debit card transaction, or other similar financial transaction. It can also be programmed to transmit an access code to a door lock on a building or vehicle. Other uses are also possible. Regardless of the particular transaction, once the rewritable RFID tag has transmitted transaction information to an RFID tag reader, the rewritable RFID tag can be erased so that a user's private information cannot be queried by an unauthorized RFID tag reader. In the case of any of these transactions, the portable device's biometric reader can be used to authenticate a user's identity before facilitating the desired in-person transaction.

The features of the devices, systems, and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the steps or states relating thereto can be performed in other sequences that are appropriate. For example, described blocks or states may be performed in an order other than that specifically disclosed, or multiple blocks or states may be combined in a single block or state.

The term "transaction" as used herein is a broad term and is used in its ordinary sense and includes, without limitation, the sending and/or receiving of information, whether online or in-person. Such information can include, for example, financial information, access code information, inter-personal communications, remotely stored data, combinations of the same, and the like.

FIG. 1 is a block diagram of a portable biometrically-secured device 10 for facilitating biometrically-secured in-person and/or online transactions, according to certain embodiments of the invention. Certain embodiments of the device 10 are similar in appearance to flash drives of the sort that provide portable electronic data storage. As illustrated, the biometrically-secured device 10 includes an interface 24 for communicatively coupling the device 10 to a host computer (not shown). In certain embodiments, the interface 24 comprises a USB interface, though other types of interfaces are also suitable, whether wired or wireless. For example, FIREWIRE, BLUETOOTH, Wi-Fi, and Wireless USB interfaces, combinations of the same, or the like are also suitable.

The device 10 can also include a display 28 for communicating textual or graphical information to a user and a user input device 26. In one embodiment, the display 28 is an organic light-emitting diode (OLED) display. In other embodiments, the display 28 can be a liquid crystal display (LCD) or any other suitable type of display. In one embodiment, the user-input device 26 is a scroll wheel. In other embodiments, keyboards, touch-screens, pointing devices, and the like can also be used. The device 10 also includes a battery 20 and power controller/batter charger 22 which power the device 10 when it is not coupled to an external power source. In one embodiment, the battery 20 is charged via a USB interface when the device 20 is coupled to a computer, though a separate power adapter unit, for example, can also be used.

Some embodiments of the device 10 also include a wireless communications module 14. In certain embodiments, the wireless communications module 14 advantageously includes RFID circuitry 16 (e.g., an RFID tag) and/or a BLUETOOTH transceiver 18. As described herein, the RFID tag 16 can be used during in-person transactions to wirelessly transmit information to an RFID tag reader in response to an interrogation signal from the RFID tag reader. These transactions may include, for example, touch-less credit card transactions, keyless entry into an office or other private space, or keyless ignition of an automobile or other vehicle. The RFID tag 16 can also be used to perform any other wireless transaction known in the art.

In certain embodiments, the RFID tag 16 can be a passive RFID tag or an active RFID tag. Moreover, in some embodiments, the RFID tag 16 is a rewritable RFID tag. The rewritable RFID tag 16 is writable so that it can be programmed by a processor 32 to adhere to several of the different communication standards (e.g., ISO standards) that are known and used in the art for different purposes.

The wireless communications module 14 can also include a BLUETOOTH, or similar-type, transceiver 18. As described herein, the BLUETOOTH transceiver 18 can be used to communicatively couple a user's BLUETOOTH enabled telephone or headset to the device 10 to allow for biometrically-secured telephone conversations (e.g., VOIP telephone conversations). The BLUETOOTH transceiver 18 can also be used to biometrically secure any other function known in the art for BLUETOOTH-enabled or similar-type devices. In addition, the wireless communications module also includes one or more antennas 12. The RFID tag antenna may be a directional antenna to reduce the probability that a communication between the RFID tag 16 and an RFID tag reader will be intercepted by a third party.

As shown, the biometrically-secured device 10 includes the processor 32. In certain embodiments, the processor 32 has a 32-bit word size, though other word sizes are also acceptable. The processor 32 can be configured to control certain operations of the device 10. For example, the processor 32 can control the interface (e.g., USB interface) 24 with a host computer (not shown). It can program the rewritable RFID tag 16 to adhere to different communication standards.

The processor 32 can control access to memory modules 34 and 36. The processor 32 can also perform other functions as desired, including encryption of information transferred between the biometrically-secured device 10 and other external devices, or between the various components of the biometrically-secured device 10.

The biometrically-secured device 10 generally includes one or more memory modules. In certain embodiments, the device 10 includes at least two physically separate memory modules 34, 36 that are biometrically-secured so that access to the memory modules 34, 36 is at least partially restricted based on whether a user has biometrically authenticated his identity. As illustrated in FIG. 1, the memory module 34 comprises a read-only memory module 34. Many different types of read-only memory can be used, including an electrically erasable programmable read-only memory (EEPROM) module. In some embodiments, the memory module 34 is not a read-only memory module but is nonetheless write-protected. For example, the memory module 34 may be write-protected by configuring it so that it cannot be written to without a user first having authenticated his identity, as described herein.

In some embodiments, the read-only memory module 34 stores the computer code for a secure operating system 35. The secure operating system 35 comprises computer-readable instructions for controlling a host computer. In certain embodiments, the secure operating system 35 can be advantageously loaded from the device 10 into the volatile memory (e.g., RAM memory) of a host computer communicatively coupled to the device 10 through the interface 24. The secure operating system 35 generally includes enough basic functionality to operate the host computer, communicate with I/O devices attached to the host computer, and to initiate a private network connection with a secure internet portal, as described herein. For example, the secure operating system 35 can include a filing system, a graphical user interface, a process management module, a memory management module, a networking management module, I/O controllers, peripheral device drivers, a VPN connection utility, a firewall module, a virus scanner module, security probes, a web browser module, various types of file editing software (e.g., word processing software, spreadsheet software, multimedia playback/editing software), combinations of the same or the like.

In some embodiments, the secure operating system 35 operates solely from the host computer's RAM memory and the one or more memory modules 34 and 36 of the biometrically-secured device 10, thus circumventing the host computer's non-volatile storage memory (e.g., the host computer's HDD). For example, once the secure operating system 35 is loaded, the host computer's HDD can be partially disabled or, in some cases, completely disabled. In some embodiments, the host computer's HDD is powered down while the host computer is under the control of the secure operating system 35 or otherwise placed in a state where the internal disks of the HDD do not rotate such that no information can be read from or written to the HDD while the host computer is under the control of the secure operating system 35.

The secure operating system 35 is configured to control operation of the host computer independently from the host computer's native operating system. For instance, the operating system 35 can advantageously include a limited number of basic device drivers usable for certain peripherals of the host computer (e.g., display, keyboard, mouse) and/or cause the host computer to operate in a type of "safe mode." In other embodiments, the operating system 35 functions in combination with the host computer's native operating system and/or a limited number of device drivers stored on non-volatile memory of the host computer.

In certain embodiments, any malware, such as spyware, viruses, key-logger programs, or other malicious software that may exist in the host computer's non-volatile storage memory is, thus, rendered non-functional while the host computer is under the control of the secure operating system 35. Furthermore, the fact that the memory module 34, which stores the secure operating system 35, is read-only or otherwise write-protected makes the secure operating system 35 resistant to malware threats, since malicious software cannot be saved to the read-only memory module, or otherwise incorporated into the secure operating system 35.

In summary, because the secure operating system 35 in some embodiments does not store information to or retrieve information from the host computer's non-volatile memory, the device 10 provides for several advantages. First, since the device 10 loads its own secure operating system 35, the user need not worry about the security of the operating system already loaded onto the host computer while performing private online transactions. Moreover, the probability that malware, such as spyware, stored on the host computer's HDD will monitor or otherwise compromise the privacy of online transactions performed using the host computer is reduced because the secure operating system 35 does not access the host computer's HDD. Second, since substantially no data is stored to the host computer from the device 10, there are few, if any, traces of financial or other private information that are left behind on the host computer once the device 10 is removed. Moreover, any private information stored in the host computer's volatile memory can be irretrievably erased by command from the secure operating system 35 or by cycling the power supply to the volatile memory. Third, since no data is stored to the device 10 from the host computer, the probability that malware may be transferred from the computer to the device is reduced.

In some embodiments, the biometrically-secured device 10 also includes a second read/writable (R/W) memory module 36. The R/W memory module 36 can also be biometrically-secured so that its accessibility can be based, at least in part, on whether a user has successfully biometrically authenticated his identity. As illustrated, the R/W memory module 36 further includes an application memory module 38 that stores information that interacts with the other components of the biometrically-secured device 10.

For example, the application memory module 38 can store information from one or more of a user's credit cards, financial accounts, building door access codes, vehicle lock and ignition system codes, combinations of the same, or the like. This data can be written to the rewritable RFID tag 18, as described herein. The R/W memory module 36 also includes a user data module 40 that stores any type of electronic information that a user wishes to biometrically secure. This may include text documents and multimedia files, for example. In other embodiments, the R/W memory module 36 may function with or without the application memory module 38 and/or the user data module 40. In certain embodiments, the user downloads information to the application memory module 38 through a host computer coupled thereto.

In some embodiments, the R/W memory module 36 also contains a configuration utility which allows a user to select one of several options when the device 10 is communicatively coupled to a host computer. For example, in certain embodiments, the user can select to perform a transaction, in which case the configuration utility causes the device 10 to load the secure operating system 35, for example, by performing a re-boot of the host computer.

The user may also choose to configure network settings that will allow the device to create a private connection to a secure internet portal, as described more fully herein. This may entail configuring an IP address, a subnet, or a Wired Equivalent Privacy (WEP) key, for example. In some embodiments, the configuration utility attempts to gather this information from the host computer directly, but it may ask a user to manually input the information as well.

In addition, the user may choose to transfer computer files between the host computer and the R/W memory module 36. In some embodiments, such files are scanned for security breaches before being stored to the R/W memory module 36. For example, the files can be scanned for viruses, other malware, or the like. If a threat is detected, the user can be alerted and questioned as to whether or not to proceed. Finally, in certain embodiments, the user may select to configure the host computer to accept private incoming connections from the secure internet portal or some other remote computer, as described herein.

The biometrically-secured device 10 also includes a biometric sensor 30 to biometrically authenticate the identity of a user. In one embodiment, the biometric sensor 30 is a fingerprint reader. In other embodiments, the biometric sensor 30 can be a retinal or iris scanner, a voice recognition unit, a face recognition unit, a hand geometry recognition unit, combinations of the same, or other like biometric sensors. As described herein, the biometrically-secured device 10 can be initially registered with unique biometric identifying information of a user. Thereafter, the biometrically-secured device 10 can advantageously deny the completion of certain in-person and online transactions unless the user successfully biometrically authenticates his identity with the biometric sensor 30.

The biometric sensor 30 can be coupled to other components of the biometrically-secured device 10, such as the processor 32 or the memory modules 34, 36 via an electrical bus 42 in order to control the operation of one or more such components. For example, one or more components of the biometrically-secured device 10 may be configured to require a user to successfully biometrically authenticate his identity before becoming operative. In one embodiment, the biometrically-secured device 10 is configured so that one or both of the memory modules are inaccessible without a user first biometrically authenticating his identity via the biometric sensor 30. Thus, the memory modules can be biometrically-secured.

Once a user's biometric information is successfully authenticated, or the user's identity is otherwise authenticated, the biometrically-secured components of the device 10 may remain operative for the duration of a session. The session may have a pre-determined length or can end after a pre-determined period of inactivity. In other embodiments, a session may consist of the completion of a single transaction, and/or the user may manually end the session. Other session lengths and types are also possible and will be apparent to those of ordinary skill in the art from the disclosure herein.

Although the device 10 has been described with respect to particular embodiments, other arrangements of the device 10 may be used. For instance, the device 10 may function without all the components depicted in FIG. 1. For example, the portable device 10 may exclude the BLUETOOTH transceiver 18 or the display 28. In other embodiments, the portable device 10 can include additional components, such as additional memory modules, input devices, communication interfaces, and the like. In some embodiments, components of the portable device 10 can be interconnected without the use of the electrical bus 42 illustrated in FIG. 1. For example, one or more of the components of the device 10 can have a dedicated connection to the processor 32.

Figure 2:
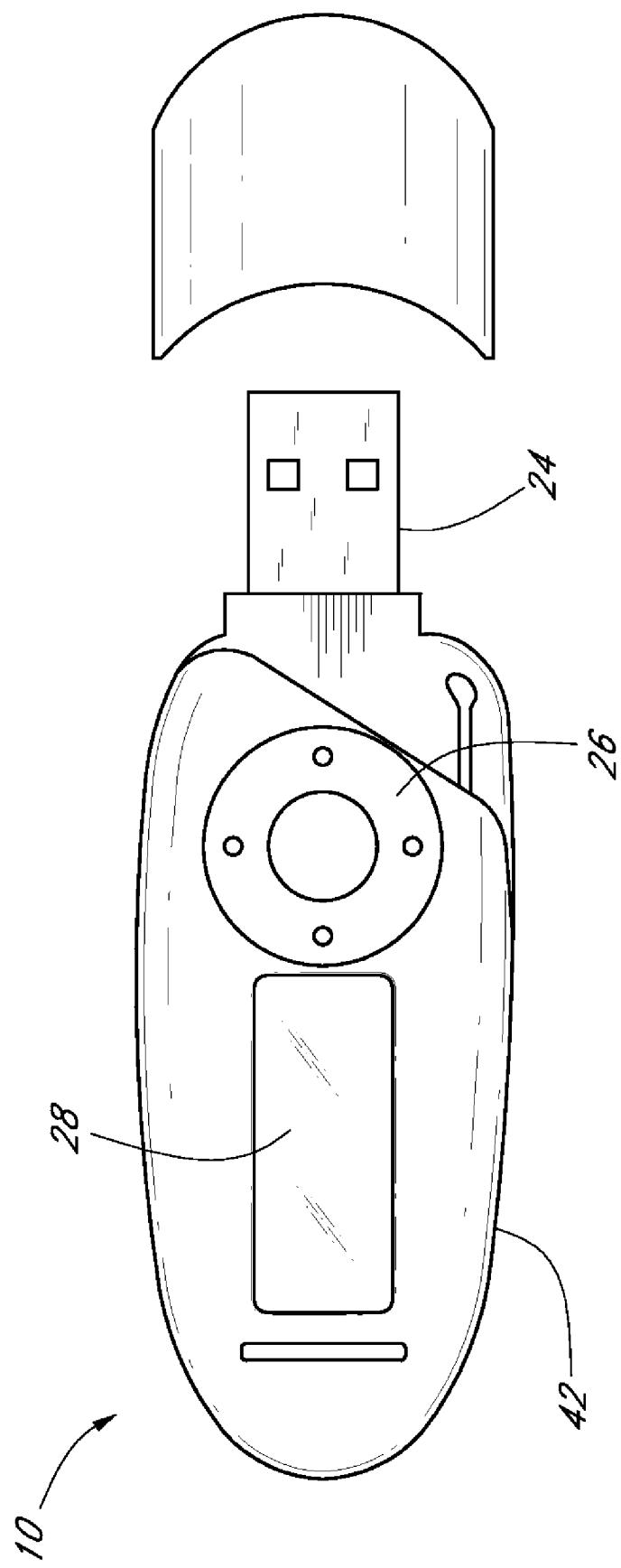
FIG. 2 is a top perspective view of one embodiment of the portable biometrically-secured device of FIG. 1.

FIG. 2 illustrates one embodiment of the portable biometrically-secured device of FIG. 1. As shown, the components of the biometrically-secured device 10 can be assembled into a housing 42. The housing 42 shown in FIG. 2 provides for an aesthetically pleasing design of the device 10. Also shown in FIG. 2 are the display 28, the interface 24 (USB port) and an input device 26, such as a scroll wheel. In some embodiments, the housing 42 includes tamper-proof features. For example, in some embodiments the housing 42 is filled with a high-strength, heat-resistant epoxy at the time of manufacture. The epoxy is allowed to cure and encases the components of the portable device 10 so that later attempts to access the components through the hardened epoxy will likely result in their destruction. In other embodiments, one or more pockets of uncured epoxy are provided inside the housing 42 such that attempts to open the housing 42 and/or to access the components inside the housing 42 cause the release of the epoxy and disable vital components of the device 10.

An epoxy can be chosen that has a higher melting point than vital components of the device 10 so that attempts to heat the housing 42 in an effort to weaken the strength of the epoxy will first result in the destruction of the vital components. While FIG. 2 illustrates the biometrically-secured device 10 as a USB-type key, in other embodiments the device 10 can be a cell phone, a PDA, a laptop computer, combinations of the same, or the like.

Figure 3:
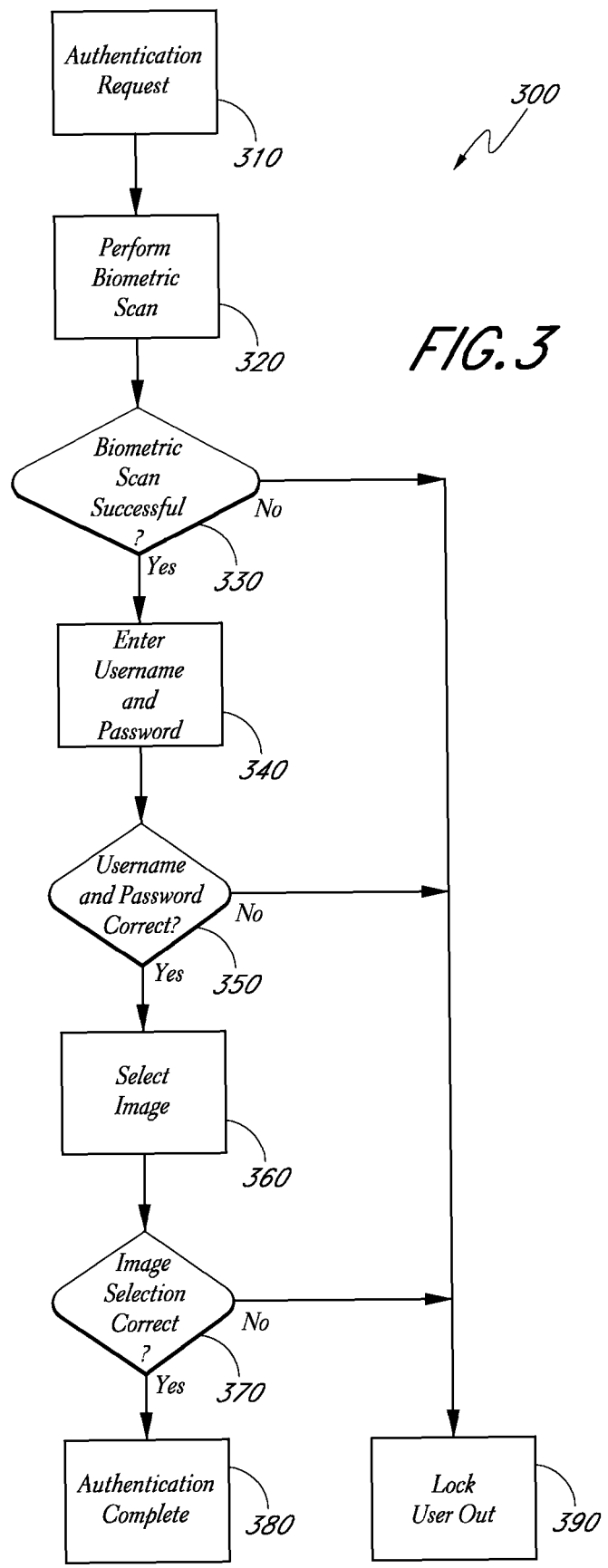
FIG. 3 is a flowchart illustrating one embodiment of an identity authentication procedure that is supported, at least in part, by the biometrically-secured device of FIG. 1.

FIG. 3 is a flowchart illustrating one identity authentication procedure 300 that is supported, at least in part, by the biometrically-secured device 10 of FIG. 1. For exemplary purposes, the authentication procedure 300 will now be described with reference to components of the biometrically-secured device 10 of FIG. 1.

As shown, the authentication procedure 300 begins with an authentication request from a user at block 310. For example, the authentication request could comprise a request by the user to perform a transaction or to activate the portable device 10. The authentication request could also come from a remote device, such as the secure internet portal described herein, during a log-in procedure to that device. At block 320, the portable biometrically-secured device 10 performs a biometric scan of, for example, the user's fingerprint.

At decision block 330, the biometrically-secured device 10 determines whether the biometric input information sensed by the biometric sensor 30 corresponds to the biometric information that was initially registered to the device 10 (e.g., whether a fingerprint entered by a user matches a fingerprint previously registered to the device 10). If the device 10 determines that there is a match, an additional level of security can be added by requiring the user to enter a username and password at block 340. In some embodiments, the username and password are required to access a secure internet portal, or other remote computer, as described herein.

If the device 10 determines that the username and password are correct, at decision block 350, yet another layer of security can be added at block 360. For example, at block 360 a user is prompted and/or required to select one of several different images and/or patterns that are displayed. For instance, the user may be given the choice of images, one of which is the "correct" image by virtue of having been pre-selected by the owner of the device 10 during a registration process that is described herein. Of course, the more images that are displayed, the greater the corresponding security enhancement will be. In one embodiment, three or more images are displayed. In another embodiment, twenty or more images are displayed.

If the user selects the correct image, then the user's identity can be deemed to have been satisfactorily authenticated at block 380. If, however, any of the three tests is failed, then the device may instruct the user to try again and/or or lock the user out of the device, as shown at block 390. The lock-out may, for example, last for some predetermined length of time, or until the device is unlocked via a re-registration process.

The authentication procedure 300 illustrated in FIG. 3 is merely exemplary of one embodiment. In other embodiments, the authentication procedure 300 may omit one or more of the tests (e.g., biometric scan, username/password, and image selection) illustrated in FIG. 3, or may add additional tests. In other embodiments, certain blocks of the authentication procedure 300 may be performed in a different sequence and/or concurrently. One or more of the blocks may also be performed by the secure internet portal and/or other remote computers, as described herein.

In certain embodiments, different levels of authentication can be defined for different situations. For example, an authentication level 1 may consist of a successful biometric scan. This level of authentication requires the user to have something (e.g., the device 10) and to be something (e.g., the registered owner of the device 10). An authentication level 2 may consist of a successful biometric scan and image selection. This authentication level requires the user to have something, be something, and know something (e.g., the correct image). An authentication level 3 may consist of a successful biometric scan, image selection, and username/password entry. This authentication procedure requires the user to have something, be something, and know several items of information, including the username and password. These authentication procedures can be performed entirely by the portable biometrically-secured device 10 or in combination with some additional device, such as the secure internet portal described herein.

Figure 4:
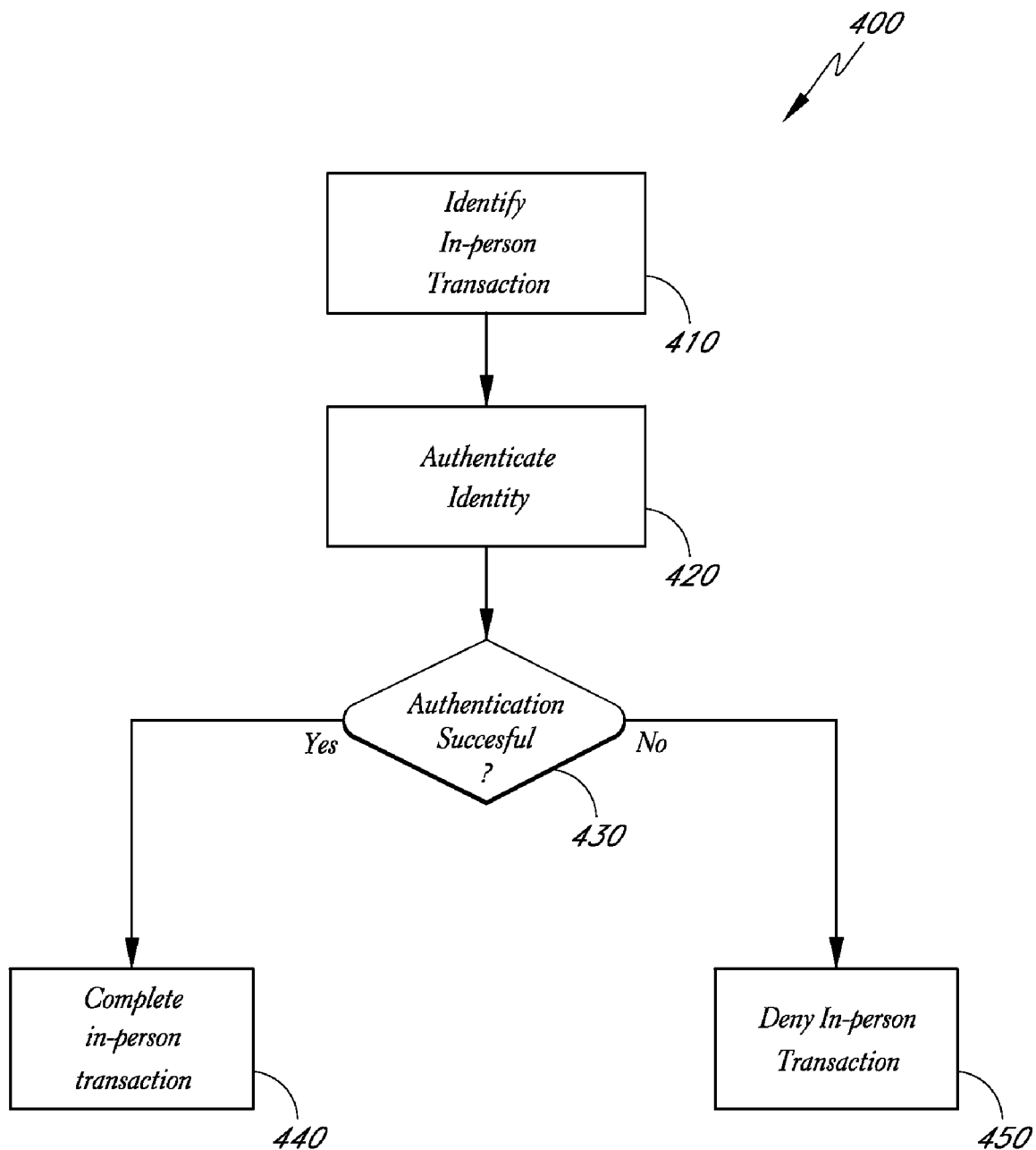
FIG. 4 is a flowchart illustrating the usage of the portable biometrically-secured device of FIG. 1 during in-person transactions, according to certain embodiments of the invention.

FIG. 4 is a flowchart illustrating the general usage of the portable biometrically-secured device of FIG. 1 during in-person transactions, according to certain embodiments of the invention. For exemplary purposes, the in-person transaction process 400 will be described with reference to components of the biometrically-secured device 10 of FIG. 1.

At block 410, a user identifies an in-person transaction that he wishes to make. At block 420, the user authenticates his identity, such as, for instance, through the authentication procedure 300 of FIG. 3. A level 1 authentication can be required such that the user must biometrically authenticate his identity using the device's biometric sensor 30. In other embodiments, a level 2 or level 3 authentication procedure can be required.

At decision block 430, the biometrically-secured device 10 determines whether the authentication procedure was successful (e.g., whether the biometric input information sensed by the sensor 30 corresponds to the biometric information registered to the device 10). If the user is successfully authenticated as the owner of the device 10, then the biometrically-secured device 10 facilitates the completion of the in-person transaction at block 440. If the authentication fails, then the device 10 denies the in-person transaction at block 450.

As described herein, the in-person transaction may be a financial transaction, such as a credit card payment at the establishment of a brick and mortar merchant. The transaction can also be the act of obtaining access to a building. Still other possible transactions include the act of obtaining access to a vehicle and/or starting the ignition system of the vehicle. Many other in-person transactions are also possible and will be recognized by those of skill in the art.

Figure 5:
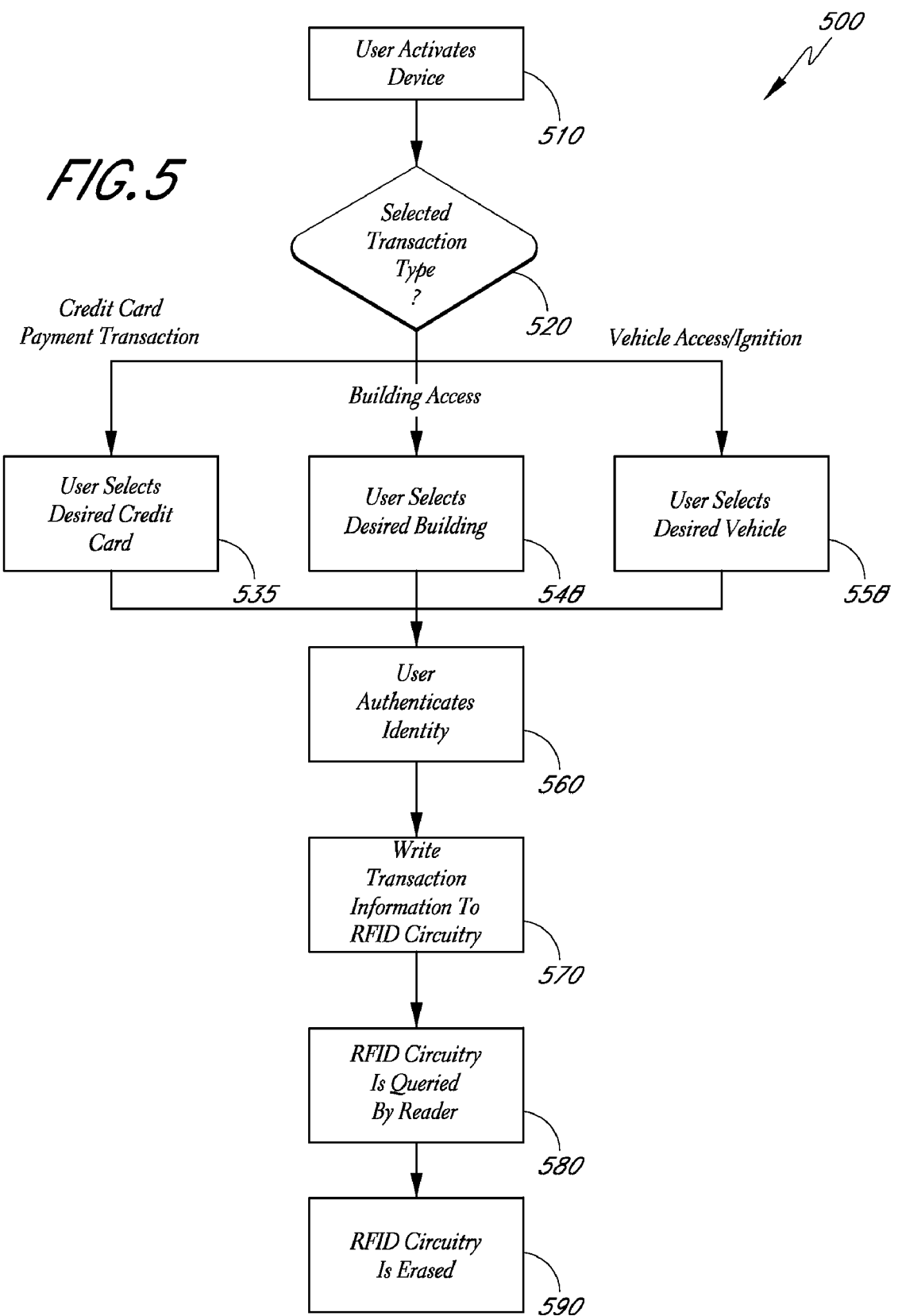
FIG. 5 is a flowchart illustrating the usage of the portable biometrically-secured device of FIG. 1 during in-person transactions, according to certain embodiments of the invention.

FIG. 5 is a flowchart illustrating the usage of the portable biometrically-secured device of FIG. 1 during in-person transactions according to one embodiment. At block 510 of the in-person transaction process 500, the user activates the portable biometrically-secured device 10, for example, by scanning in his fingerprint. At decision block 520, the user selects an in-person transaction type from a series of choices shown on the device display 28. The user can scroll through the list and select to make a credit card transaction, a building access transaction, or a vehicle access/ignition transaction.

If the user selects a credit card transaction, at block 535, the device display 28 shows the user a list of credit cards for which the user has previously entered the corresponding information, such as the cardholder's name, billing address, expiration date, security code, combinations of the same, or like information. Those of skill in the art will recognize that other payment options (e.g., debit cards) can also be used in similar ways. In certain embodiments, the available credit card information is advantageously shown on the display 28, for example, in textual format or as actual images of each credit card.

Alternatively, at decision block 520 a user may select a building access transaction. If a building access transaction is selected, at block 540 the user selects the particular building, room, office, dwelling, or the like, that he wishes to enter and for which he has previously entered the corresponding access code into the device 10. The user may also select a vehicle access/ignition transaction, in which case the user selects the desired vehicle to unlock or start at block 550.

In certain embodiments, regardless of the type of transaction which the user has selected in blocks 520 through 550, once the selection is complete, the user authenticates his identity at block 560. In some embodiments, this authentication step is a level 2 authentication, though other levels can also be used. Assuming that the authentication is successfully completed, at block 570 the device proceeds to write the necessary transaction information to the rewritable RFID tag 16. In some embodiments, the processor 32 writes the necessary transaction information from the R/W memory module 36 to the rewritable RFID tag 16.

In the case of a credit card transaction, in certain embodiments, the user's credit card information is written to the RFID tag 16 where it is formatted and transmitted according to the standards (e.g., ISO standards) known and used in the art. In certain embodiments, since the rewritable RFID tag 16 is appropriately formatted, no additions or modifications to existing payment infrastructure, such as point-of-sale terminals, etc., are required. Similarly, in the cases of building access and vehicle access/ignition transactions, the applicable information and codes are written, for example, from the biometrically-secured application data memory module 38 to the rewritable RFID tag 16 according to the applicable transmission and formatting standards conventionally used for those types of transactions.

At block 580, the rewritable RFID tag 16 is queried and read by an RFID tag reader. Once the rewritable RFID tag is queried, or interrogated, the processor 32 erases the rewritable RFID tag 16 to reduce the possibility that the tag 16 may be queried and read by an unauthorized third party. In some embodiments, the act of erasing the rewritable RFID tag consists of writing random data or other "garbage" data, to the RFID tag 16. In some embodiments, the rewritable RFID tag 16 is erased in response to having been interrogated by an RFID tag reader.

In some embodiments, the rewritable RFID tag 16 is erased by the processor 32 a pre-determined amount of time after the transaction information has been written to the rewritable RFID tag. For example, the processor can erase the transaction information from the rewritable RFID tag 16 approximately one microsecond or less, one millisecond or less, one second or less, or five seconds or less after the transaction information has been written to it.

In some embodiments, the length of time that the transaction information is stored in the rewritable RFID tag 18 is chosen based on the standard query time of an RFID tag/reader pair according to an ISO standard being used for a selected transaction. For example, the query time for different transactions may vary depending upon the amount of data transmitted and the data rate of the transmission. In these embodiments, the length of time that the transaction information is stored in the rewritable RFID tag 18 can be selected so as to allow an RFID tag reader just sufficient time to query the rewritable RFID tag 18. In other embodiments, the processor 32 may detect when the RFID tag 18 has been interrogated and erase the RFID tag 18 shortly thereafter. Moreover, in some embodiments, the user can manually cause the processor 32 to erase the rewritable RFID tag.

Figure 6:
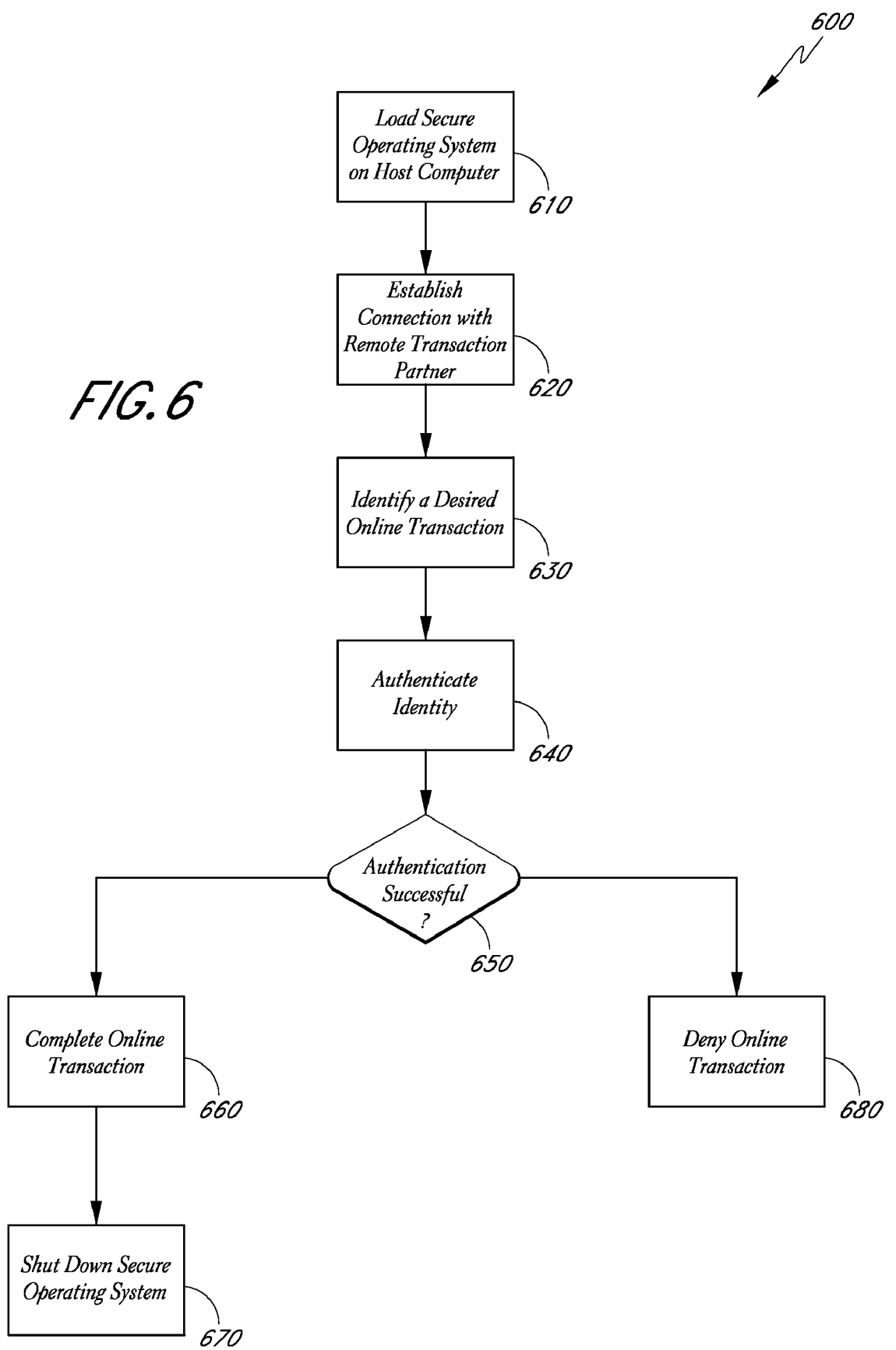
FIG. 6 is a flowchart illustrating the usage of the portable biometrically-secured device of FIG. 1 during certain online transactions, according to certain embodiments of the invention.

FIG. 6 is a flowchart generally illustrating the usage of the portable biometrically-secured device of FIG. 1 during online transactions. In particular, FIG. 6 illustrates an exemplary embodiment of an online transaction process 600. At block 610, a user secures a host computer by using the portable biometrically-secured device 10 to load the secure operating system 35 into the host computer's volatile memory.

At block 620, the user establishes a private computer network connection (e.g., a VPN connection) with an online transaction partner. The transaction partner can be, for example, an online merchant, a repository of electronic files (e.g., the user's home computer when he is away, a corporate server, etc.), or a communication partner (e.g., an email recipient's mail server, a text messaging partner, a sender or recipient of a VOIP call, etc.). The private connection can be formed directly with the transaction partner or via a secure internet portal, as described herein. In some embodiments, the entire online transaction is completed through the private connection. In other embodiments, only a portion of the transaction is completed through the private connection.

At block 630, the user identifies the particular online transaction that he wishes to perform with the transaction partner. For example, the user may select a transaction option presented to him by a graphical user interface (GUI) of the secure internet portal described herein. In some situations, the user can navigate to the web page of an online merchant and select a purchase to complete. In addition, the user can select a person with whom he wishes to communicate or a remote computer with which he wishes to connect.

At block 640, the user authenticates his identity. The authentication procedure can be completed using only the portable, biometrically-secured device 10, or using the device 10 in combination with a secure internet portal or some other remote device. For example, the user may enter his biometric information with the biometric sensor 30 on the device 10, and then transmit a username and password to a secure internet portal or to the transaction partner.

In some embodiments, the device 10 is used to transmit information that is derived from the user's biometric signature to a remote device, such as the secure internet portal or transaction partner, so that the remote device can make an independent determination as to whether the user's biometric signature matches one that has been previously registered to the portable device 10. This can be done, for example, using an asymmetric cryptographic method described herein.

At decision block 650, the portable device 10, or a combination of the portable device 10 and one or more remote devices, such as a secure internet portal and/or transaction partner, determines whether the authentication procedure has been successfully completed. If the user successfully completes the authentication procedure, then the online transaction is allowed to be completed. Once the transaction is completed, the secure operating system 35 that was loaded onto the host computer can be shut down, and the host computer's volatile memory can be erased to substantially reduce, if not eliminate, traces of the transaction on the host computer. If the authentication step fails, however, the online transaction is denied at block 680.

Figure 7:
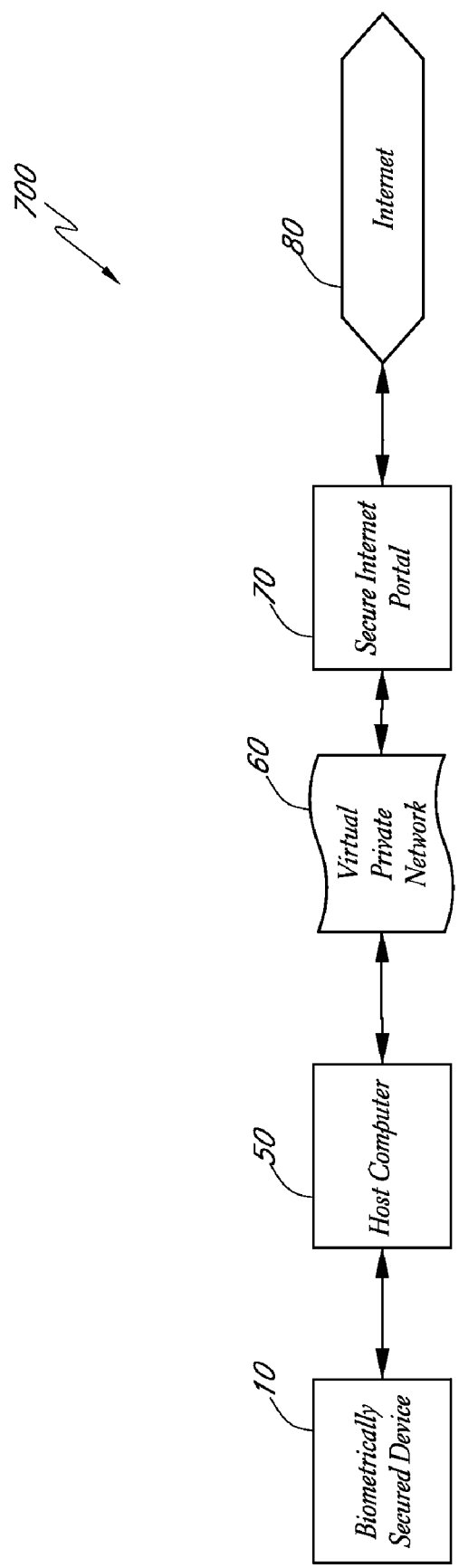
FIG. 7 is a dataflow chart of communications between the biometrically-secured device of FIG. 1, a host computer, a secure internet portal, and the internet, according to certain embodiments of the invention.

FIG. 7 is a dataflow chart of communications between the biometrically-secured device 10, a host computer 50, a secure internet portal 70, and the internet 80, according to certain embodiments of the invention. Various firewalls (not shown) may also be included between the components of the online transaction system 700. For example, a firewall may be included between the host computer 50 and the secure internet portal 70. As disclosed herein, in certain embodiments, the portable biometrically-secured device 10 advantageously communicates with a host computer 50 through a suitable interface 24. In one embodiment, the interface 24 is a USB port. Through this port, the device 10 and host computer 50 exchange information such as instructions for the secure operating system 35, financial information, as well as various kinds of transaction information received by the host computer 50 from remote devices.

The host computer 50 can communicate with the secure internet portal 70 through a private connection 60. In one embodiment, the private connection 60 is an encrypted VPN connection, though other alternatives may also suitable. The VPN connection 60 can be set up and configured according to any method known or developed in the art. In certain embodiments, the level of encryption can be chosen based on the available bandwidth between the host computer 50 and the secure internet portal 70. For example, DES Level I, II, or III encryption can be used depending upon the available bandwidth of the connection.

In some embodiments, the VPN connection is formatted in such a way that once it is activated, no remote computer is able to connect to the host computer 50 outside of the VPN connection 60. In certain embodiments, the VPN connection 60 can also switch between a plurality of modes, as well as switch between different levels of encryption to reduce the probability that the VPN connection 60 can be cracked or piggybacked. The VPN connection 60 can also be configured to request a new server authentication certificate at random intervals to further enhance the security of the connection.

In certain embodiments, the secure internet portal 70 is a general purpose server computer, or cluster of server computers (e.g., a database server, a web server, an email server, or the like), that is configured to receive incoming private connections from users of the portable, biometrically-secured device 10 and programmed with several functional modules described herein. For example, the functional modules can present and facilitate various online transactions to the user. These can include inter-personal electronic communications, online purchases, connections to remote computers, and combinations of the same or the like. The secure internet portal 70 can also communicate with the internet 80 at large and act as a conduit for information flow between the portable biometrically-secured device 10, the host computer 50, and the internet 80. The secure internet portal 70 can also act as a conduit for information flow between the portable device 10 and a remote computer or network.

Figure 8:
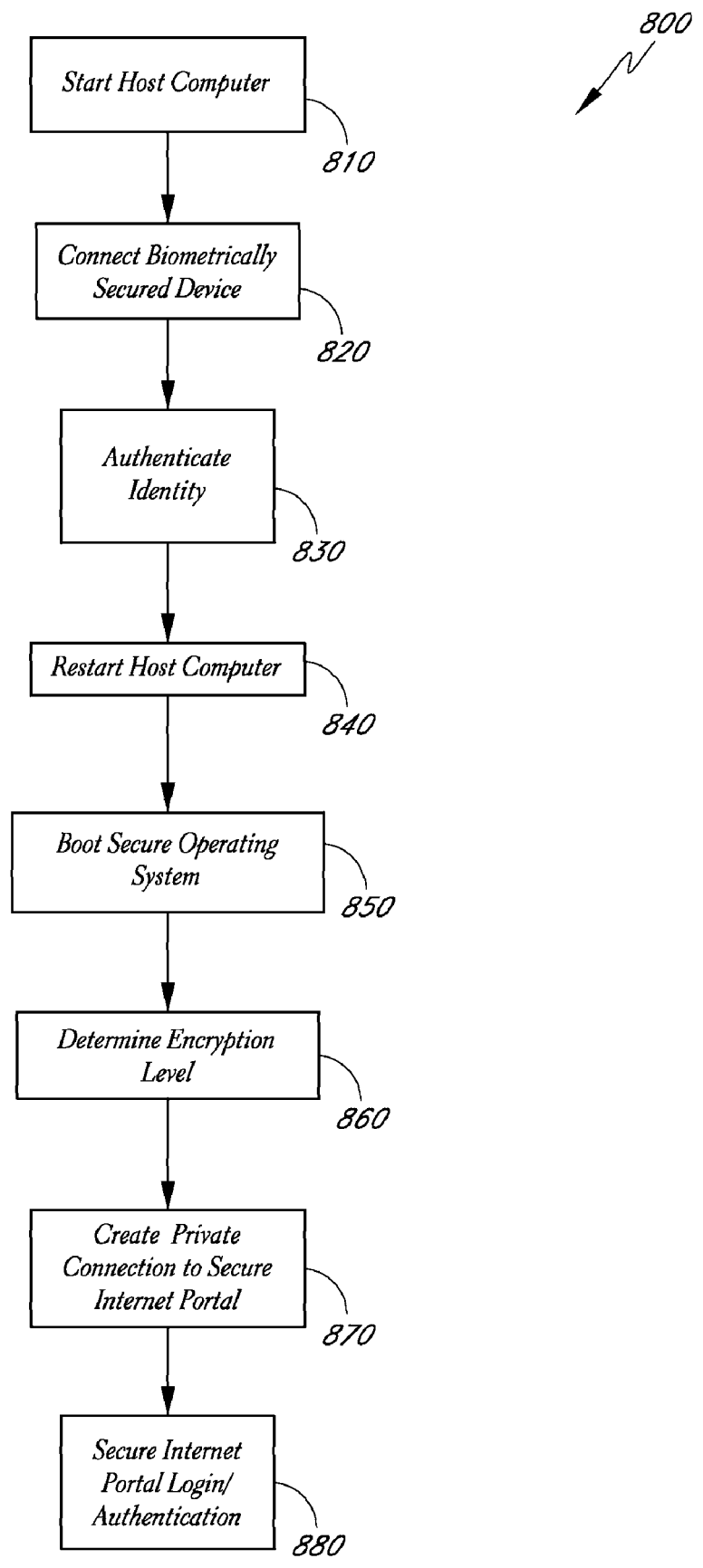
FIG. 8 is a flowchart illustrating one embodiment of a method for establishing a secure platform from which to perform online transactions by using the biometrically-secured device of FIG. 1 to load a secure operating system onto a host computer.

FIG. 8 is a flowchart illustrating one embodiment of a boot loader method 800 for establishing a secure platform from which to perform online transactions by using the biometrically-secured device 10 to load a secure operating system 35 onto a host computer 50. In some embodiments, the boot loader method 800 is used to restart the host computer 50 with the pre-loaded secure operating system 35 from the read-only memory module 34 of the portable device 10. This helps reduce the probability that hacking and/or malware will affect the host computer 50 because the portable device 10 loads the secure operating system 35 into the host computer's volatile memory and then dismounts the host computer's HDD. As this process executes, the following messages can be displayed to the user: 1) boot process started; 2) detecting the peripheral devices available in the host computer 50; 3) checking driver availability; 4) checking boot loader; 5) executing grub; and 6) re-starting host computer.

At block 810, a user starts a host computer 50 and normally boots the native operating system installed on the host computer 50. At block 820, the user inserts the biometrically-secured device 10 into a USB port of the host computer 820. In some embodiments, the interface between the biometrically-secured device 10 and the host computer is not a USB port, and in those embodiments communication between the device 10 and the host computer 50 can be established according to the specific interface 24 chosen. At block 830, the device 10 instructs the user to authenticate his identity. In some embodiments, this is a level 1 authentication procedure, though others can also be used.

In one embodiment, if the authentication step is successfully completed, the configuration utility allows the user to select any one of several options. For example, the configuration utility can allow the user to cause the device 10 to load the secure operating system 35 by performing a re-boot of the host computer 50. The user may also choose to configure network settings that will allow the device to create a private connection to the secure internet portal 70, transfer computer files from the host computer 50 to/from the R/W memory module 36, or configure the host computer 50 to accept private incoming connections from the secure internet portal or some other remote computer.

If the user chooses to load the secure operating system 35, the processor 32 may first determine whether any additional device drivers, not already stored on the portable device 10, are needed for the secure operating system 35 to control the host computer 50 and/or any attached devices, such as keyboards, pointing devices, graphics cards, etc. This can be done, for example, by detecting the devices attached to the host computer 50. If device drivers are needed, the processor 32 instructs the host computer 50 to download the drivers over the internet from, for example, a driver server module of the secure internet portal 70.

If a particular driver is not available from the secure operating system, the portable device 10 can determine the severity of the impact on the host computer 50 of not having the driver. If the degree of severity is low, then the boot process will be executed. If the unavailable drivers have a high degree of severity, then a request for the drivers to be made available by the secure internet portal 70 can be made and the user can be instructed to try again later. In other embodiments, the host computer 50 may load drivers to the portable device 10 from a compact disk (CD) or other like medium. Once peripheral device drivers are loaded to the portable device 10, they may be stored for future use or discarded after the session with the host computer 50 has ended.

Once the appropriate drivers have been downloaded to the portable biometrically-secured device 10 for usage with the secure operating system 35, it instructs the host computer 50 to restart at block 840. The user can be given the choice of whether to boot into the secure operating system 35 or into the native operating system of the host computer 50. If the user selects the secure operating system 35, the portable device 10 boots the secure operating system 35 at block 850. In other embodiments, the host computer's BIOS can be configured to detect a connection from the portable device 10 and boot directly from the device 10, so that it is unnecessary to start and boot the host computer 50 normally first.

In some embodiments, the boot process is achieved by creating a boot loader. For example, a boot loader function can be called. Execution of the boot loader function calls a primary boot loader and then calls a secondary boot loader. The boot loader loads itself into memory in the following stages: 1) the primary boot loader is read into memory from, for example, the master boot record by the host computer's BIOS; 2) the secondary boot loader is read into memory from the portable device 10. The secondary boot loader finds the HDD of the host computer 50 and selects the desired kernel or operating system to boot. 3) Once the boot loader determines which operating system to start, it loads the operating system into memory and transfers control of the machine to that operating system (e.g., the secure operating system 35). If the secure operating system 35 is loaded, the HDD of the host computer 50 is dismounted during the boot process and no further interaction with the hard drive takes place. 4) A Log file can be created to store the step-by-step process involved in the boot process. The purpose of log file is to maintain the status of the boot process. The log file can be stored on the portable device 10.

As described herein, in some embodiments, the secure operating system 35 operates in the host computer's volatile memory, generally without reading data from, or storing data to, the host computer's non-volatile memory, such as its HDD. Thus, after the user is finished completing the desired transactions, substantially no personal or private information is left on the host computer 50.

At block 860, the host computer 50 determines the available bandwidth of a connection between the host computer 50 and the secure internet portal 70, and selects an appropriate level of encryption for the connection. At block 870, the host computer 50 initiates a private encrypted VPN connection 60 with the secure internet portal 70, the settings and configuration of which can be determined using the configuration utility described herein. Once the private connection 60 with the secure internet portal 70 has been established, the secure internet portal 70 initiates an authentication procedure.

In some embodiments, the secure internet portal 70 initiates a level 3 authentication procedure, requiring the user to scan his biometric information, enter a username and password, and make an image selection. As described herein, information derived from the user's biometric signature that is scanned by the biometric sensor 30 can be sent to the secure internet portal 70 for independent authentication by the secure internet portal 70 of the user's biometric signature. If the authentication process is successfully completed at block 880, the secure internet portal can advantageously display the user's homepage, which contains links to various functional modules.

Figure 9:
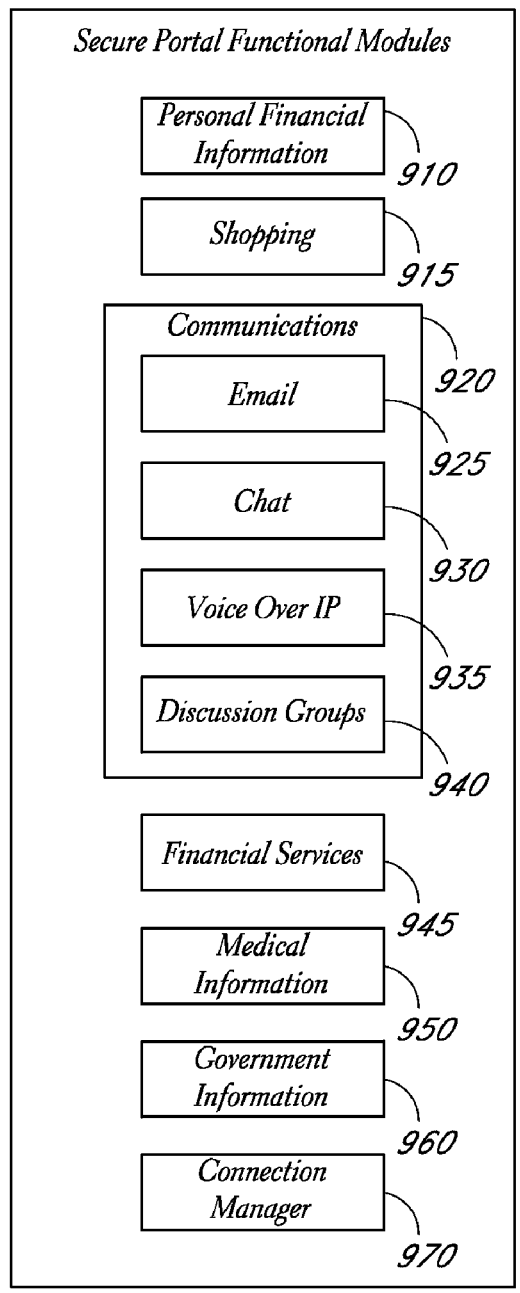
FIG. 9 is a block diagram of various functional modules offered by a secure internet portal, according to certain embodiments of the invention.

FIG. 9 is a block diagram 900 of various functional modules offered by the secure internet portal. In certain embodiments, once connected to the secure internet portal 70, a user can select from transactions offered by the various functional modules. For example, the secure internet portal 70 may include one or more of the following functional modules depicted in FIG. 9: a personal financial information module 910; a shopping module 915; a communications module 920, including an email module 925, an online chat module 930, a VOIP module 935, and an online discussion groups module 940; a financial services module 945; a medical information module 950, a government information module 960; a connection manager module 970; and a file manager module 980.

In certain embodiments, the user accesses the functional modules provided by the secure internet portal 70 via a graphical user interface provided by the secure internet portal 70. For example, the secure internet portal 70 can download web pages to the host computer 50 with clickable links to invoke the various functional modules. Some embodiments only include a subset of the illustrated functional modules, while other can include functional modules not illustrated.

In certain embodiments, the personal financial information module 910 is a biometrically-secured repository of various types of personal financial information. For example, the personal financial information module 905 can store information related to one or more of the user's credit cards, debit cards, financial accounts or the like. From this module, the user can manage credit cards that he wishes to add to, or remove from, the portable biometrically-secured device 10. In certain embodiments, credit card and/or other financial information that the user adds to the personal financial information module 905 for online purchases can also be added to the application memory module 38 for in-person transactions as well. The personal financial information module 910 can also store records, such as credit card transaction histories, electronic receipts, credit card reward points, combinations of the same, or the like. In some embodiments, the personal financial information module 905 also includes a password manager that stores a list of the user's various passwords that he uses to access computers, websites, etc. Other types of information can also be stored in the personal financial information module 910, such as account balances and/or pin numbers.

The shopping module 915 allows a user to make biometrically-secured online purchases without transmitting his payment information to the online merchant. In some situations, these purchases involve communications between one or more remotely located devices.

Figure 10:
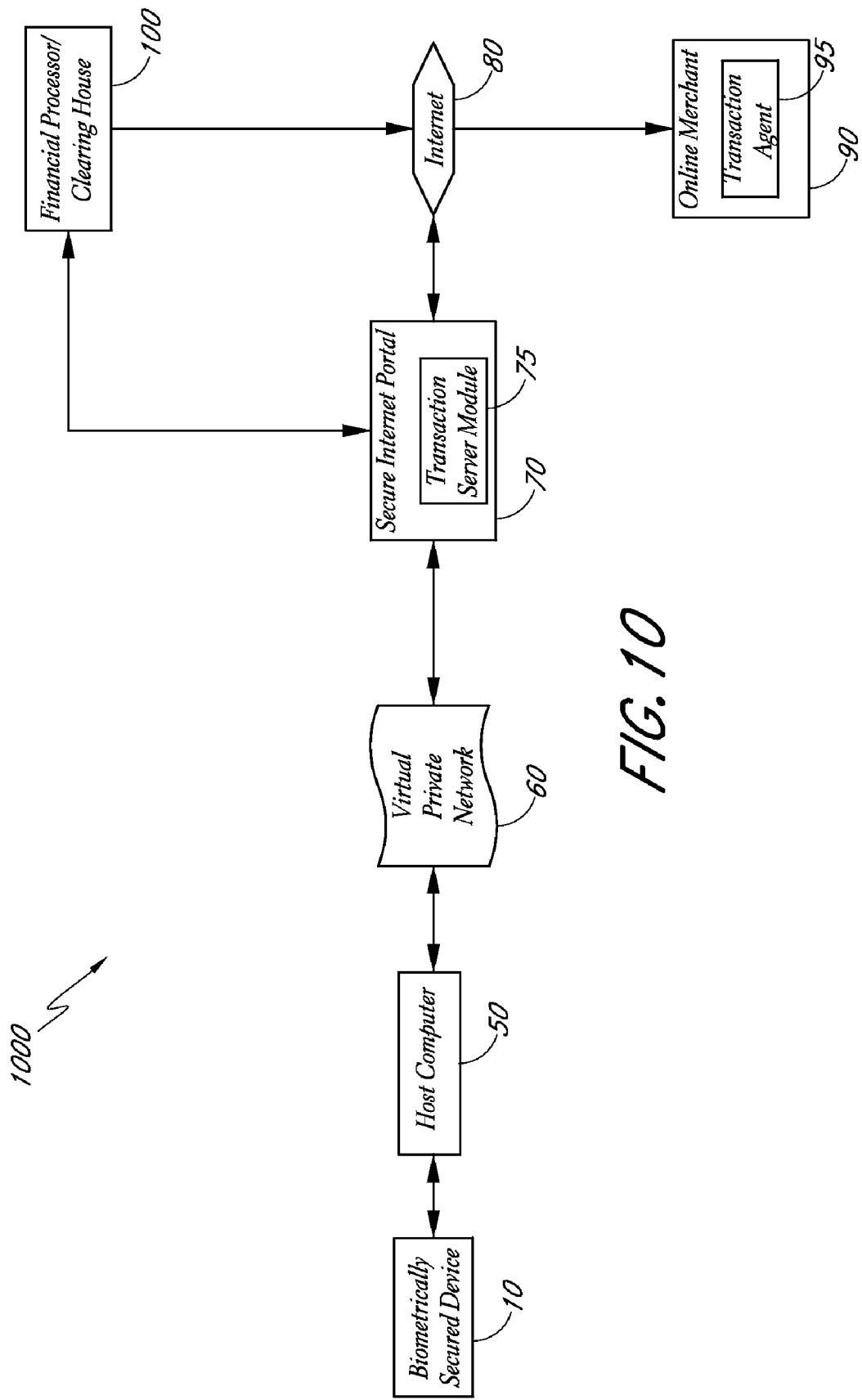
FIG. 10 is a dataflow chart of communications between the biometrically-secured device of FIG. 1, a host computer, a secure internet portal, an online merchant, and a financial process/clearing house during an online financial transaction according to one embodiment.

A dataflow chart of these communications is shown in FIG. 10. In particular, FIG. 10 illustrates an exemplary embodiment of a financial transaction system 1000 having communications between the biometrically-secured device 10, the host computer 50, the secure internet portal 70, an online merchant 90, and a financial processor/clearing house 100 during an online financial transaction. As shown, the portable biometrically-secured device 10 is communicatively coupled to the host computer 50 that is in turn communicatively coupled to the secure internet portal 70 via a private connection such as the encrypted VPN connection 60.

In the depicted embodiment, the secure internet portal 70 includes a transaction server module 75. In some embodiments, a user communicates with the online merchant 90 via the secure internet portal 70 which communicates with the online merchant 90 via the internet at large with, for example, secure sockets layer (SSL) encryption. In other embodiments, the secure internet portal 70 may communicate with the online merchant 90 via a VPN connection or dedicated communication lines. The user can also communicate directly with the online merchant 90 via the internet 80, such as, for example, via an unsecured connection. As is further illustrated, the online merchant 90 further includes a transaction agent 95. The secure internet portal 70 also includes a connection to the financial processor/clearing house 100. In certain embodiments, the connection between the secure internet portal 70 and the financial processor/clearing house 100 is a private connection, such as one or more dedicated lines (e.g., ADSL/T1+ lines) or other such private transmission channel.

Figure 11:
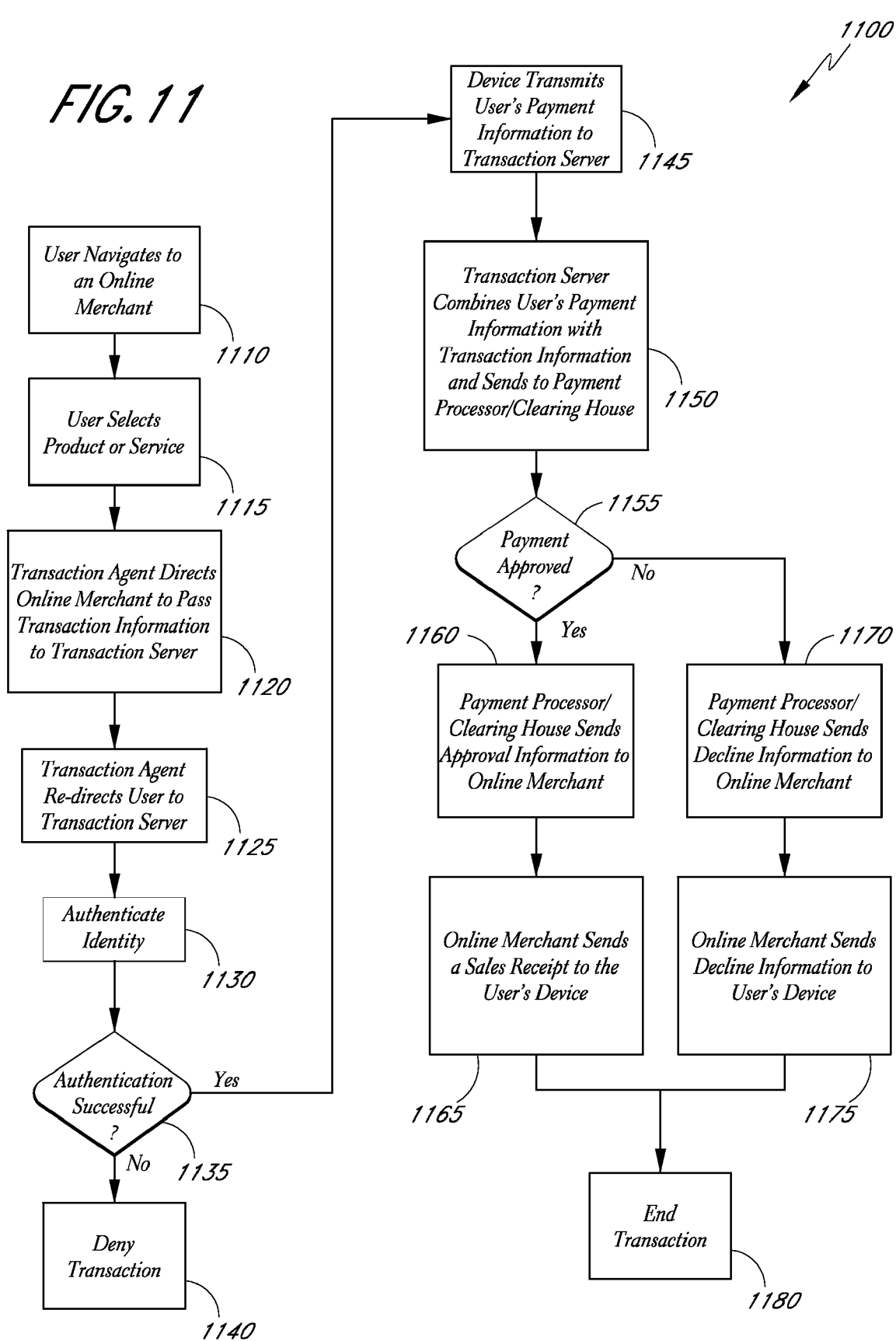
FIG. 11 is a flowchart illustrating one embodiment of a method for performing an online financial transaction using the biometrically-secured device of FIG. 1.

An online purchase will now be described with reference to FIG. 11, which is a flowchart illustrating one embodiment of an online financial transaction process 1100. For exemplary purposes, the online financial transaction process 1100 will be described with reference to the financial transaction system 1000 of FIG. 10.

At block 1110, a user navigates, for example, via the secure internet portal 70, to the online merchant 90 (e.g., Amazon, Buy.com, Circuit City) over the internet 80. For example, the user may utilize a web browser to access a website of the online merchant 90. At block 1115, the user selects a product or service to purchase from the online merchant and begins a checkout process to complete the selected purchase. The transaction agent 95 is configured to provide users of the portable, biometrically-secured device 10 with an option during the checkout procedure to make a biometrically-secured payment via the transaction server 75. In certain embodiments, the transaction agent 95 comprises executable code running on one or more servers of the online merchant 90. In other embodiments, the transaction agent 95 can comprise a device that communicates with the computing device(s) of the online merchant 90. If the user has not already loaded the secure operating system 35 onto the host computer, the host computer may instruct the user to do so.

At block 1120, when such a user elects to submit an order, the transaction agent 95 causes transaction information, such as an online merchant identification code, an order identification code, total purchase price, combinations of the same, or the like, to be sent to the transaction server 75 over the internet 80. At block 1125, the transaction agent 95 also re-directs the user to the transaction server 75. For example, the user's web browser can be directed to a web page hosted by the transaction server 75 or, if the host computer has not already established a private connection with the transaction server 75, it can be instructed to do so. As illustrated in FIG. 10, the connection between the user and the transactions server is a private connection such as an encrypted VPN connection 60.

Then, at block 1130, the transaction server 75 instructs the user to authenticate his identity, for example, using a level 3 authentication procedure. If the authentication procedure is unsuccessful, then the transaction is denied at block 1140. In contrast, if the authentication procedure is successfully completed, the portable biometrically-secured device 10 allows the user to select and/or transmit payment information to the transaction server 75 via the private connection 60 to the secure internet portal 70 at block 1145. Unlike conventional, less secure online transactions, the user does not transmit his personal credit card or other payment information to the online merchant 90. In conventional online transactions, such transmissions of credit card information and the like are problematic because they pass over the unsecured internet 80 rather than through a private connection.

Moreover, in conventional online transactions, each purchase from a new online merchant generally requires the user to send his credit card information to the new merchant, resulting in the widespread dissemination of his payment information and increased probability of a security breach that would jeopardize the secrecy of the information. Instead, as illustrated in more detail in FIG. 10, in the financial transaction system 1000 the user transmits his payment information to the transaction server 75 via the private connection 60 and not to the online merchant 90. Moreover, in some embodiments, the transaction server 75 does not store the user's payment information beyond the time necessary to complete the transaction.

At block 1150, once the transaction server 75 has received the user's payment information from the portable biometrically-secured device 10 as well as the transaction information (e.g., merchant identification code, order identification code, total purchase price, etc.) from the online merchant 90, then the transaction server 75 transmits the payment and transaction information to the financial processor/clearing house 100. In certain embodiments, this transmission can be done in such a manner as to emulate a general online transaction payment request in the format and way that such payment requests are normally submitted from merchants to existing payment processors 100. Thus, from the point of view of the payment processor 100, the payment request appears as a typical one that it might otherwise receive directly from an online merchant 90, and little or no modifications to the payment processor 100 are necessary.

Once the payment and transaction information are received by the payment processor/clearing house 100, it may in turn forward the information to the user's credit card issuer and affiliate bank to determine whether the payment request is approved. If the payment is approved by the user's credit card issuer at block 1155, the payment processor/clearing house 100 transmits payment to the online merchant's bank as well as order confirmation/fund approval information to the online merchant 90, at block 1160. The online merchant 90 then sends a sales receipt to the user's portable biometrically-secured device 10, for example, via the transaction server 75 or directly to the device 10. The transaction is then completed at 1180. Once more, unlike conventional methods, the purchase transaction can be completed without sending the online merchant 90 personal financial information.

If, however, the user's payment is not approved by the financial processor/clearing house 100, then it sends declined payment information to the online merchant 90 at block 1170. At block 1175, the online merchant 90 then notifies the user that the purchase has been declined and the transaction is ended at block 1180.

Figure 12:
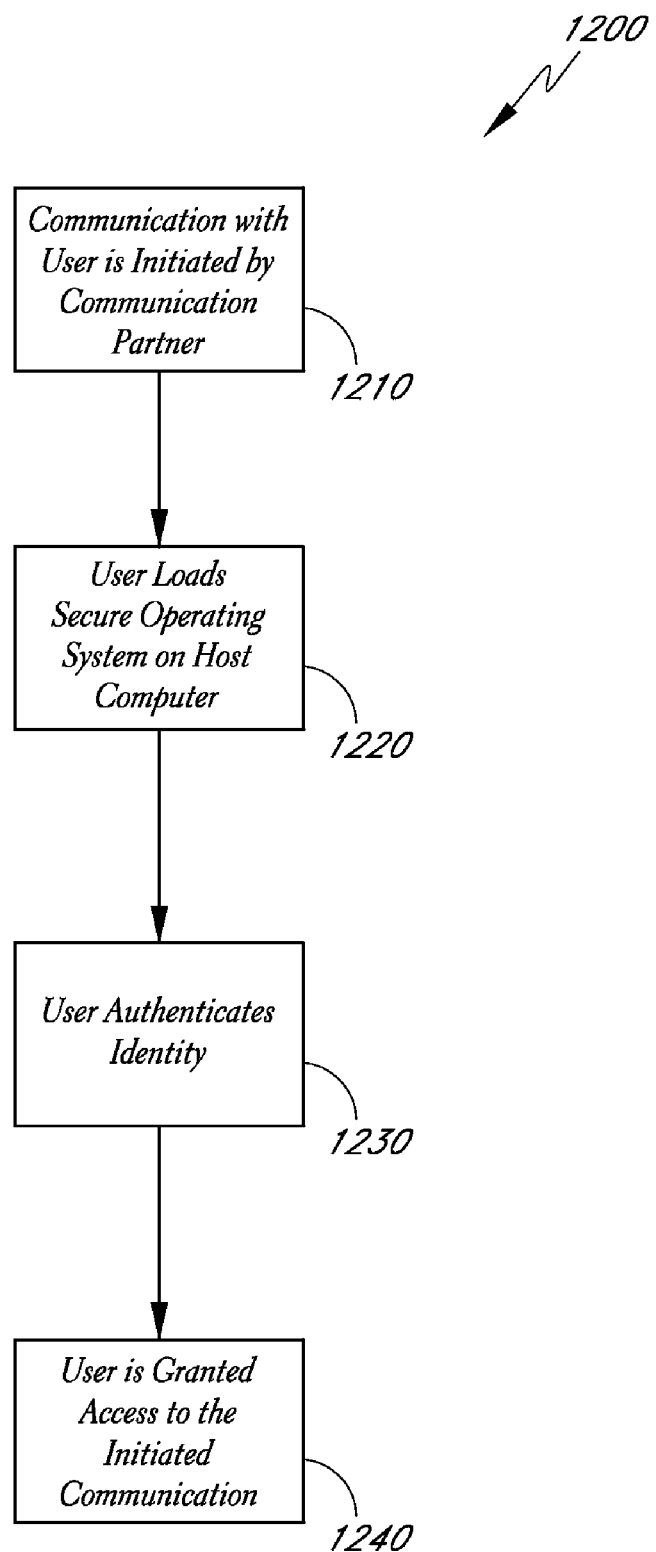
FIG. 12 is a flowchart illustrating one embodiment of a method for performing electronic communications using the biometrically-secured device of FIG. 1.

The secure internet portal also includes a communications functional module 920. FIG. 12 is a flowchart illustrating one embodiment of a method for performing electronic communications using the biometrically-secured device 10. As shown in more detail in FIG. 9, the communications module 920 can include email 925, chat 930, voice messaging such as VOIP 935 (a user can make/receive VOIP calls with microphone and speaker coupled to the user's host computer 50, or by connecting to the portable biometrically-secured device's BLUETOOTH transceiver 18 using a BLUETOOTH enabled cell phone, for example), and/or discussion group 940 services.

With reference to FIG. 12, a process 1200 for performing a secure communication session is disclosed. In certain embodiments, the communications functional module 920 provides for a secure communication session involving a sender and a recipient, or multiple senders and/or recipients. As shown, at block 1210 of the process 1200, a sender initiates a communication session with a recipient-user of the portable, biometrically-secured device 10.

When initiating the communication session, the sender can, for example, select an option that requires the recipient to authenticate his identity before gaining access to the communication session. In some embodiments, both the sender and the recipient are users of the secure internet portal 70 and each uses a portable, biometrically-secured device 10, or other like device, to communicate with one another. However, even if the sender is not a user of the secure internet portal 70 (e.g., he sends an email from an email server outside the secure internet portal 70, initiates a chat session without using the secure internet portal 70 service, etc.), the sender can be provided with the option to require the recipient of the communication to authenticate his identity before receiving the communication. In certain embodiments, the initiated communication session is in the form of an email sent to the recipient, a VOIP telephone call (or other type of voice messaging session) to the recipient, a request to chat online, a request to join an online discussion group or the like. Other types of communication sessions, such as paging, net meetings, group emails, conference calls, or the like are also possible.

At block 1220, the recipient creates a secure computing platform from which to communicate. This can be done, for example, by using the portable biometrically-secured device 10 to load the secure operating system 35 onto a host computer 50, as described herein. In some embodiments, the user is also required to log into and/or form a connection with the secure internet portal 70, as described herein. For example, at block 1230, the recipient authenticates his identity to the secure internet portal 70. In some embodiments, a level 3 authentication process is used, but others are also suitable.

Assuming that the recipient successfully completes the authentication process, at block 1240 the recipient is granted access to the communication session initiated by the sender. For example, in one embodiment, the recipient may be granted access to an email sent to him. In another embodiment, the user may be allowed to answer an incoming VOIP call. In another embodiment, the user may be permitted to begin an online chat session or enter into a discussion group to which he has been invited. Other types of communication sessions are also possible. Since the authentication procedure includes a biometric authentication step in some embodiments, the sender can ensure that the recipient of the communication session he initiated is the intended recipient.

In some embodiments, these communications services are provided in a closed loop manner between two users of the secure internet portal 70 and portable, biometrically-secured devices 10. For example, in certain embodiments, communications between two users of the secure internet portal 70 are not transmitted outside of secure connections to and from the secure internet portal 70, thus decreasing the possibility that such communications may be intercepted by unauthorized parties. In addition, the communication services can be configured so that they are inaccessible outside of a private connection with the secure internet portal 70. For example, the communications module 920 can be configured so that email messages, chat transcripts, or the like cannot be printed or saved outside of the secure internet portal 70.

In addition, the email service may require a user to authenticate his identity each time before viewing a saved email message. This authentication procedure can include a biometric authentication step so that even unauthorized persons who gain access to a user's host computer 50 while he is logged into the secure internet portal 70 are prevented from viewing the user's email messages or gaining access to other communication sessions intended for the user. In the case of a chat session, for example, the sender can require the recipient to re-authenticate his identity at any point during the chat according to the sender's discretion. It should be noted that in some embodiments, if the sender, or initiator of the communication session, is also a user of the portable, biometrically-secured device 10, he too may be required to boot his host computer 50 with the secure operating system 35 and authenticate his identity in the ways described herein before being permitted to initiate the communication session.

Although the process 1200 has been described with reference to particular embodiments, other embodiments of the process 1200 may have more or fewer block than those depicted in FIG. 12. For instance, in certain embodiments, a user may receive an indication that a biometrically-secure communication has been sent to him or her. In certain embodiments, the indication may include less information than the entire communication, such as a header or subject line of an email message.

With reference to FIG. 9, the secure internet portal 70 also includes the financial services module 945, the medical information module 950, and the government information module 960. Each of these functional modules allows a user to access, create, remove, or modify his accounts, settings, profile, combinations of the same, or the like, with third parties who are affiliated with the secure internet portal service 70. For example, in certain embodiments, a user can utilize the financial services module 945 to access his investment portfolios with affiliated brokerage firms after authenticating his identity according to the methods described herein.

Likewise, in certain embodiments, a user can utilize the medical information module 950 to access private medical records, submit questions to medical providers regarding private health conditions, and/or access/change insurance coverage after authenticating his identity. The requirement that a user authenticate his identity to access these medical records may comply with certain government regulations. Similarly, in certain embodiments, the government information module 960 allows a user to access information from affiliated government entities upon authenticating his identity. In one embodiment, the government information module 960 operates as a secure online forum to allow users to vote in government elections, since the user can be required to biometrically authenticate his identity beforehand.

The secure internet portal 70 also includes a connection manager functional module 970. In certain embodiments, the connection manager module 970 allows users to configure and manage connections to various remote computers and services. In some embodiments, the user connections to remote computers are private, biometrically-secured, and are initiated from a secure computing platform (e.g., a host computer 50 that has been loaded with the secure operating system 35). With these connections, a user can remotely access files and remotely control a computer with, for example, a remote desktop client that is included with some embodiments of the secure operating system 35.

Figure 13:
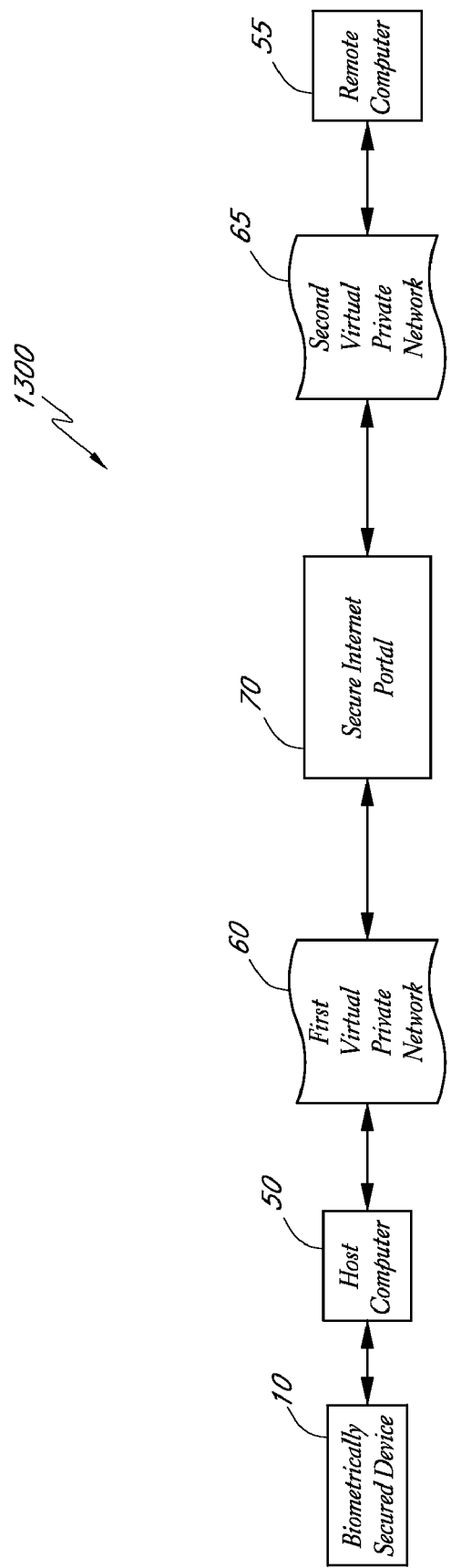
FIG. 13 is a dataflow chart of communications between the biometrically-secured device of FIG. 1, a host computer, a secure internet portal, and a remote computer.

FIG. 13 is a dataflow chart of a remote access system 1300 configured to provide for communications between a user and a remote computer 55. As shown, the remote access system 1300 comprises the biometrically-secured device 10, the host computer 50, the secure internet portal 70, and the remote computer 55. As described herein, the portable biometrically-secured device 10 is communicatively coupled to the host computer 50 that is in turn communicatively coupled to the secure internet portal 70 via a private connection such as the encrypted VPN connection 60. In turn, the secure internet portal 70 is communicatively coupled to the remote computer 55.

In certain embodiments, the remote computer 55 can be the user's home computer, for example, when he is traveling away from home. The remote computer 55 can also be a file server, such as a corporate file server, or some other network-attached electronic data storage device, to name only a few examples. In some embodiments, the connection between the secure internet portal 70 and the remote computer 55 is a private connection, such as another encrypted VPN connection 65. While FIG. 13 illustrates the host computer 50 being communicatively coupled to the remote computer 55 via the secure internet portal, in some embodiments the host computer 50 and the remote computer 55 have a direct private connection 60 with one another instead of connecting via the secure internet portal 70 and two private connections 60, 65.

Figure 14:
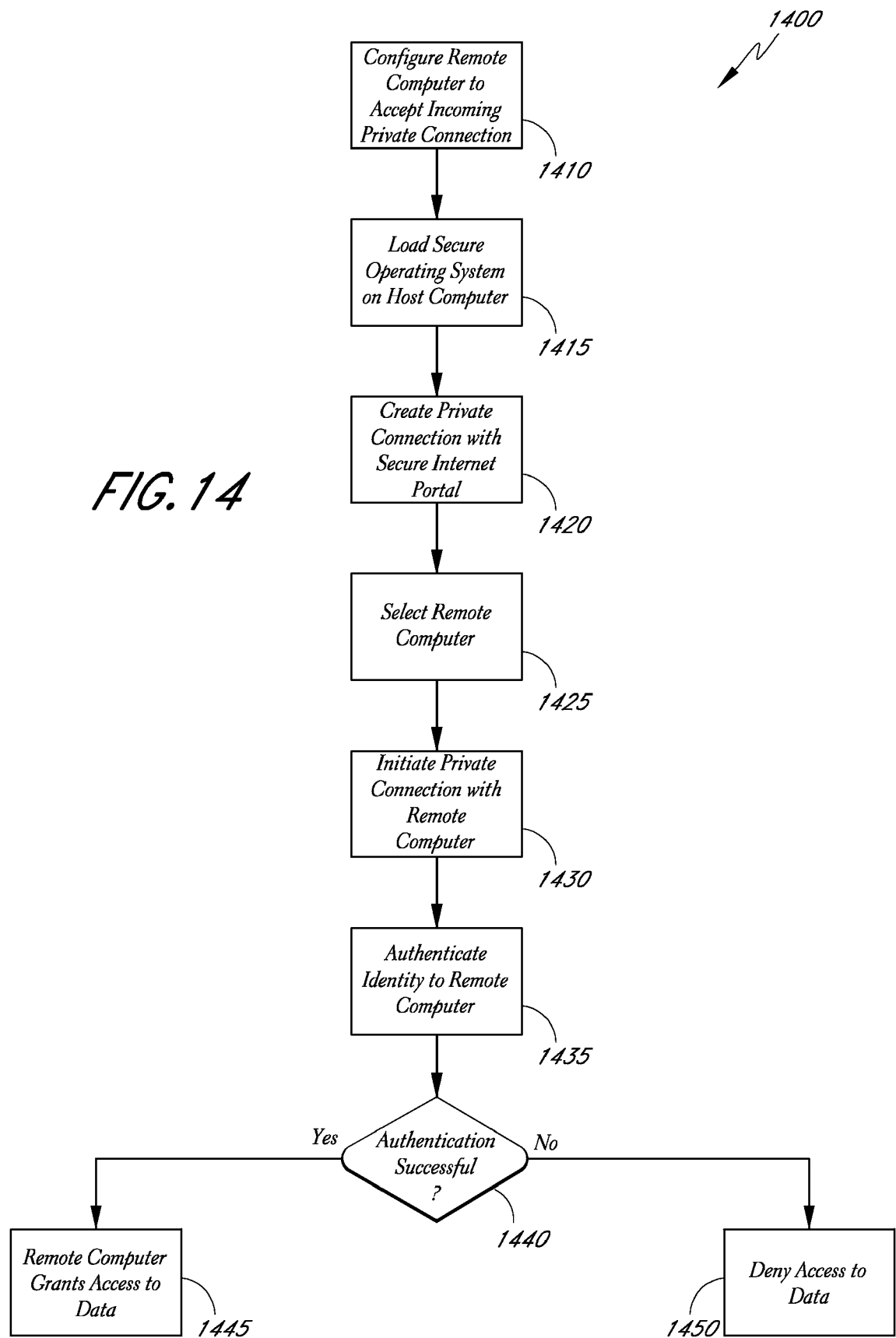
FIG. 14 is a flowchart illustrating one embodiment of a method for connecting to a remote computer using the biometrically-secured device of FIG. 1.

FIG. 14 is a flowchart illustrating one embodiment of a remote access process 1400 for connecting to a remote computer, such as the remote computer 55 in the remote access system 1300. In certain embodiments, the remote access process 1400 advantageously utilizes the biometrically-secured device 10.

At block 1410 of the remote access process 1400, a user configures a selected remote computer (e.g., remote computer 55) to accept access requests from a host computer (e.g., host computer 50) that is in communication with the user's portable, biometrically-secured device 10 when the user is away from the remote computer 55. This configuration of the remote computer 55 can be done, for example, at a time when the user is physically present at the remote computer 55.

In certain embodiments, the remote computer 55 can be configured to accept private incoming connections from the secure internet portal 70, for example, in cases where a user connects to the remote computer 55 via the secure internet portal 70. In addition, the remote computer 55 can be configured to accept private incoming connections directly from a particular host computer that has been appropriately configured to create a private connection to the remote computer.

In certain embodiments, configuration of the remote computer 55 is completed using the configuration utility that is loaded from the user's portable, biometrically-secured device 10 when the device 10 is communicatively coupled to the remote computer 55. Again, the user can perform the configuration operation at a point in time when he is physically present at the remote computer 55, allowing him to remotely connect to the computer 55 at a later time. As described herein, in some embodiments, the user is required to biometrically authenticate his identity to the portable device 10 before the configuration utility is loaded on to the remote computer 55.

In certain embodiments, once the configuration utility has loaded, the user may choose to enable the remote computer 55 to be controlled via a remote desktop client included with the user's portable, biometrically-secured device 10 and/or for file sharing (e.g., the user may select files to be shared remotely). Once the private connection (e.g., encrypted VPN connection) between the remote computer 55 and, for example, the secure internet portal 70 is configured, the secure internet portal 70 can be notified so that the connection can be offered by the connection manager module 970 at a later time when the user wishes to remotely connect to the remote computer 55.

After the remote computer 55 has been appropriately configured, at block 1415 the user loads the secure operating system 35 onto the host computer 50, as described herein. At block 1420, the host computer 50 creates the private connection 60 with the secure internet portal 70, and the user logs into the secure internet portal 60. In other embodiments, the host computer 50 may create a private connection directly to the remote computer 55 without connecting via the secure internet portal 70.

At block 1425, the user accesses the connection manager functional module 970 using, for example, a graphical user interface of the secure internet portal 70. The connection manager functional module indicates which of the user's remote connections are available for use and allows the user to select a particular remote computer 55 with which he wishes to connect. Then, at block 1430, the secure internet portal 70 initiates a private connection 65 with the remote computer 55 by, for example, forming an encrypted VPN connection between the two computers. In certain embodiments, the encryption level of the connection can be scaled according to the bandwidth of the transmission channel between the two computers.

In one embodiment, the remote computer 55 is configured to only accept incoming private connections that are initiated with the user's personal portable, biometrically-secured device 10. Moreover, the remote computer 55 can be configured to allow such a connection only after the user has completed a log-in process to the remote computer 55. This authentication process occurs at block 1435.

In some embodiments, the log-in process includes the transmission of information derived from the user's biometric signature to the remote computer 55 for independent verification of the user's identity. In this way, the remote computer 55 can make an independent determination as to whether the user's biometric signature corresponds to that of a user who has previously configured the remote computer 55 to accept private incoming connections. This remote biometric authentication process can be performed according to the methods described herein. In one embodiment, the authentication procedure at block 1435 is a level 3 authentication procedure.

If the authentication procedure is unsuccessful, then at block 1450, the remote computer 55 denies access to the user. If, however, the authentication procedure is successfully completed, then the user is granted access to the remote computer 55 at block 1445. Once the user is granted access to the remote computer 55, then he may use a remote desktop client included with some embodiments of the secure operating system 35 to control the remote computer 55 as if he were physically present at the remote computer 55.

Once a user is granted access to the remote computer 55, he may also be permitted to access and modify electronic files stored by the remote computer 55. In some embodiments, the secure internet portal 70 assembles links to files from a plurality of remote computers 55 so that they can be accessed and edited from a central repository, as well as being synchronized between the plurality of remote computers 55 when changes are made. In some embodiments, the user can modify files using, for example, software provided with the secure operating system 35 and running on the host computer 50, or online software, such as word processing or spreadsheet tools, offered by the secure internet portal 70. Other types of software can also be provided by the secure operating system 35 or the secure internet portal 70 to allow the user to create or modify various types of files. In some embodiments, the electronic files can be downloaded to the user's portable, biometrically-secured device for offline work. In these cases, a log can be kept of offline changes made to the files, so that once the user's portable, biometrically-secured device is connected to the remote computer 55 again, the files stored in each location can be synchronized.

In the case where the remote computer 55 is, for example, a corporate file server, the company can be given the ability to change permission settings that control which files on the corporate file server are accessible by the user. If at any time the company removes access privileges to a file from a user after he has stored the file on his portable device 10, then, in certain embodiments, the secure internet portal 70 can be configured to send a command to the user's portable device 10 to delete the file from the user's device 10 once the device 10 is again used to establish a connection with the secure internet portal 70. This command can be issued, for example, when the user's portable device 10 contacts the secure internet portal 70 to download peripheral device drivers for use in controlling the host computer 50.

Figure 15:
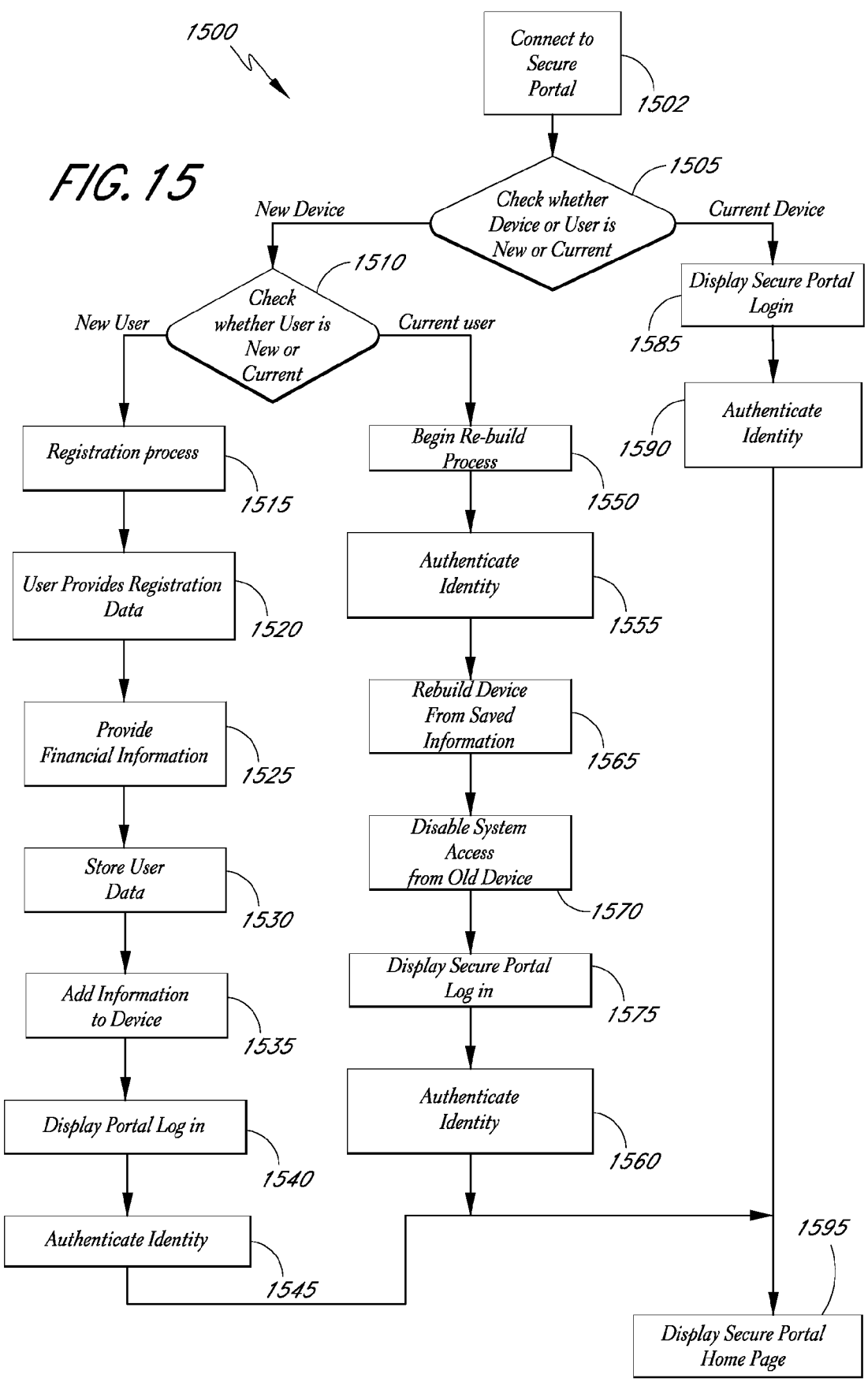
FIG. 15 is a flowchart illustrating one embodiment of a method for registering and restoring information to the biometrically-secured device of FIG. 1.

In certain embodiments, the secure internet portal 70 can include a registration and rebuild service for initially registering a user's portable, biometrically-secured device 10 and/or for rebuilding the user's information to a new portable, biometrically-secured device 10 if his old device 10 becomes lost, stolen, or damaged. FIG. 15 is a flowchart 1500 illustrating one embodiment of a method for registering and restoring information to the biometrically-secured device 10.

When a user first purchases a portable, biometrically-secured device 10, as described herein, he establishes a communication connection between the device 10 and a host computer. The portable device 10 loads a secure operating system 35 onto the host computer 55 and establishes a private connection to a secure internet portal 70, as shown at block 1502. In certain embodiments, each portable, biometrically-secured device 10 includes a unique identification code which is checked by the secure internet portal 70 each time the device 10 is used to connect to the secure internet portal 70. If the identification code is not new, at block 1585, the secure internet portal 70 initiates a login procedure, causes the user to authenticate his identity at block 1590, and displays the secure internet portal homepage at block 1595. If, however, the identification code is recognized as being new, then, at block 1505, the device 10 is determined to be a new device 10, and the process passes to block 1510.

At block 1510, the secure internet portal 70 determines whether the new device 10 is being used by a new user or by a current user. This can be done, for example, by allowing the user to so indicate at the time of the login procedure to the secure internet portal. If the new device 10 is being used by a new user, then at block 1515 the secure internet portal 70 begins a registration process for the user and the new device.

For example, the secure internet portal can direct the user to a registration page where, at block 1520, the user provides personal registration data. This data can include the user's name, a chosen username, password, and/or a selected one of a plurality of images for use in the authentication processes described herein, contact information, and combinations of the same or the like. In some embodiments, the registration data also includes information derived from the new user's unique biometric signature.

For example, a multi-part biometric key can be formed which allows the user to later authenticate his identity to the portable, biometrically-secured device 10, the secure internet portal 70, and/or other remote computers. The biometric key can be generated by the portable device 10 based upon the user's unique biometric signature, which is inputted using the biometric sensor 30. In some embodiments, the unique biometric signature comprises information indicative of one or more of the user's fingerprints.

In certain embodiments, during the registration process, one or more of the user's fingerprints are read by the sensor 30 according to any method known in the art (e.g., optical imaging, capacitive and/or temperature mapping, etc.). For example, the user's fingerprint can be read and various point samples (e.g., minutia points of the fingerprint) taken and used to generate a unique identifier. In some embodiments, the unique identifier is a mathematical algorithm that can be used to re-create the information that is extracted from the user's fingerprint. The identifier can then be split into multiple parts, each part being stored in a separate location. For example, one part can be stored on the user's portable, biometrically-secured device 10, another part can be stored at the secure internet portal 70, while other parts can be stored at other remote computers. In some embodiments, none of the parts of the unique identifier is independently capable of re-creating the information that is extracted from the user's fingerprint.

Later, after a user has registered his portable device 10, when he scans his fingerprint with the biometric sensor 30, the unique identifier is re-generated. The portion of the re-generated identifier can then be compared to the portion that is already stored in the portable device 10 to determine whether the user is the owner of the device 10. The secure internet portal 70 can independently authenticate the user's identity in a similar manner. For example, when a user scans his fingerprint to re-generate the unique identifier, a portion of the identifier can be transmitted to the secure internet portal 70 where it can be compared against that portion of the unique identifier that has already been stored at the secure internet portal. A similar process can be performed by any other remote device where a portion of the unique identifier has been stored.

Moreover, in certain embodiments, a key generation algorithm is used to generate a private/public key pair from the user's biometric signature (e.g., fingerprint). The algorithm is designed so that the key pair is unique to the user's fingerprint and can be re-created therefrom. The private key can be stored on the user's portable device 10, while the public key is transmitted to the secure internet portal 70 and/or other remote computers. Communications from the user's portable device 10 can be encrypted using the private key and then decrypted with the public key at, for example, the secure internet portal 70. This type of asymmetric cryptographic process is yet another way by which a user's identity can be biometrically authenticated by the portable, biometrically-secured device 10 as well as being independently authenticated by the secure internet portal 70 or any other remote computer that receives the public key.

In certain embodiments, the biometric authentication performed by the secure internet portal and/or other remote computers can be performed without the need to store or share images of the user's fingerprints. By breaking the biometric authentication algorithm into multiple parts that are each stored in separate locations, a biometric authentication procedure can be made to have redundant security points without a single point of failure.

Once the user has provided his registration information, he can also provide any desired financial information (e.g., credit card information), at block 1525. At block 1530, some or all of the user's private information can be stored to one or more back-up file locations. For example, back-up file locations may include the secure internet portal 70 itself, a corporate server, the user's personal computer, network-attached storage devices, combinations of the same or the like.

At block 1535, the user's private information that he has provided to the secure internet portal 70 during the registration process is added to the user's portable biometrically-secured device 10. This can include the user's financial information, username, password, choice of security images, and/or other electronic files. Then, at block 1540, the secure internet portal initiates its log-in procedure, as described herein. At block 1545, the user authenticates his identity, for example, according to a level 3 authentication procedure. Assuming the successful completion of the authentication procedure, the secure internet portal displays the home page and the user is permitted to select one of the various transactions facilitated by the portal's functional modules (block 1595).

Should the user's portable device 10 become lost, stolen, and/or damaged, in certain embodiments, he can replace the old device 10 with a new one, and rebuild his private information to the new device. For example, if, at block 1510, it is determined that the new portable device 10 belongs to an existing user, then the user is directed to begin a data rebuild process, beginning at block 1550.

At block 1555, the user authenticates his identity using, for example, a level 3 authentication procedure. Even though the portable, biometrically-secured device 10 is a new one, the biometric sensor can be used to regenerate the user's unique mathematical key pair so that his identity can be biometrically authenticated by the secure internet portal 70. Assuming that the authentication procedure is successfully completed, at block 1565, the secure internet portal accesses the user's back-up file locations and transfers the user's private information, including financial information, electronic files, and the like, to the user's new portable device 10. At block 1570, the secure internet portal optionally references the unique identification code of the user's previous device 10 and adds it to a banned list. In certain embodiments, access to the secure internet portal by the old device 10 can also be disabled.

In some embodiments, additional security procedures are implemented to protect the secrecy of the user's data on his old portable, biometrically-secured device 10. For example, in certain embodiments, each time the portable device 10 is communicatively coupled with a host computer 50, the unique identification code of the device 10 is transmitted to the secure internet portal 70. After being added to the banned list, the next time that the old device 10 is coupled to a host computer 50, the secure internet portal 70 can issue a "scorched earth" command to the old portable device 10, causing the processor 32 to erase the device's memory modules and/or otherwise disable the old device 10. Thus, despite the fact that the private information stored on the user's old device 10 is protected from being accessed by unauthorized individuals with the biometric authentication procedures and tamper-resistant features described herein, the scored earth command can add an additional degree of security in the case of loss or theft.

Once the user's personal information has been added to the user's new portable, biometrically-secured device, at block 1575, the secure internet portal 70 initiates its login procedure. At block 1580, the user authenticates his identity, for example, using a level 3 authentication procedure. Then at block 1595, the secure internet portal 70 displays the home page, as discussed herein.

The foregoing disclosure has oftentimes partitioned devices and system into multiple modules (e.g., components, computers, servers) for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations (e.g., over a network, serial interface, parallel interface, or internal bus), software implementations (e.g., database, passing variables), or a combination of hardware and software.

Moreover, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In one embodiment, the computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices.

Furthermore, it will be understood from the disclosure herein that a variety of communication media may be used between modules of embodiments of the invention. For instance, as described in more detail herein, in certain embodiments, the communications medium is the internet, which is a global network of computers. In other embodiments, the communications media may comprise other communication systems including by way of example, dedicated communication lines, telephone networks, wireless data transmission systems, two-way cable systems, customized computer networks, interactive kiosk networks, automatic teller machine networks, interactive television networks, combinations of the same, or the like.

While certain embodiments have been explicitly described, other embodiments will become apparent to those of ordinary skill in the art based on this disclosure. Therefore, the scope of the inventions is intended to be defined by reference to the claims and not simply with regard to the explicitly described embodiments. Furthermore, while some embodiments have been described in connection with the accompanying drawings, a wide variety of variation is possible. Components, and/or elements may be added, removed, or rearranged. Additionally, processing steps may be added, removed, or reordered. For example, the various user identity authentication procedures described herein can be performed at different times than is indicated in the accompanying figures.

What is claimed is:

1. A portable device for facilitating secure transactions, the portable device comprising:
    an interface configured to couple to a host computer that operates under the control of a native operating system;
    a biometric sensor configured to receive identification information from a user;
    a memory configured to store transaction information and a secure second operating system for execution by the host computer; and
    a processor coupled to the memory and the biometric sensor, the processor being configured to authenticate the identification information and, upon authentication of the identification information, to cause the portable device to communicate the secure second operating system to a volatile memory of the host computer to control operations of the host computer independently from the native operating system of the host computer, the secure second operating system being programmed to cause the host computer to use the transaction information during the performance of a transaction with a second computer coupled via a network to the host computer.

2. The portable device of claim 1, wherein the transaction comprises at least one of an online credit card purchase and an electronic person-to-person communication.

3. The portable device of claim 1, wherein the transaction information comprises user financial information.

4. The portable device of claim 3, wherein the user financial information comprises data from a plurality of credit cards of the user.

5. The portable device of claim 1, wherein the memory comprises a first read-only memory module to store the secure second operating system, and a second read-write memory module to store the transaction information.

6. The portable device of claim 1, wherein the transaction information stored in the memory is substantially inaccessible until authentication of the identification information.

7. The portable device of claim 1, further comprising a housing to contain the biometric sensor, the memory, and the processor.

8. The portable device of claim 7, wherein the housing comprises a thumb drive housing.

9. The portable device of claim 1, wherein the biometric sensor comprises a fingerprint sensor.

10. The portable device of claim 1, wherein the secure second operating system is configured to at least partially disable a non-volatile disk of the host computer.

11. A method of performing a secure transaction, the method comprising:
    establishing communication between a host computer and a handheld device;
    receiving with the handheld device biometric information from a user;
    determining whether the biometric information corresponds to an approved biometric signature;
    loading operating system instructions from the handheld device to a volatile memory of the host computer when the biometric information corresponds to the approved biometric signature; and
    performing an online transaction with a second computer communicatively coupled via a network to the host computer while the host computer is operating under the control of the operating system instructions loaded from the handheld device.

12. The method of claim 11, wherein the online transaction comprises at least one of a credit card purchase and an electronic person-to-person communication.

13. The method of claim 11, further comprising:
    receiving additional user input; and
    performing a second authentication of the user based at least in part on the additional user input.

14. The method of claim 13, wherein receiving additional user input comprises:
    displaying a plurality of images, one of which has been previously selected; and
    receiving an identification of the selected image from the user.

15. The method of claim 11, additionally comprising transmitting a key derived from the user identification information to the second computer.

16. The method of claim 15, additionally comprising performing, with the second computer, an independent determination that the biometric information corresponds to the accepted biometric signature.

17. The method of claim 11, additionally comprising:
    restarting the host computer prior to loading the second operating system instructions to the volatile memory of the host computer; and
    erasing the volatile memory after completion of the online transaction.

18. The method of claim 17, additionally comprising preventing read/write access to a hard disk drive of the host computer while the host computer is operating under the control of the operating system instructions loaded from the handheld device.

19. A portable device for facilitating secure transactions, the portable device comprising:
   means for communicating with a host computer having a first operating system;
   means for storing transaction information and second operating system instructions for execution on the host computer;
   means for receiving biometric information from a user;
   means for authenticating the biometric information and for loading the second operating system instructions from said means for storing to the host computer upon said authentication; and
   means for performing a transaction with a second computer communicatively coupled to the host computer via a network while the host computer is operating under the control of the second operating system instructions loaded from said means for storing in place of the first operating system.

20. The portable device of claim 19, wherein the transaction information comprises information related to a plurality of financial accounts, and further comprising means for prompting the user to select information of one of the plurality of financial accounts to be used in the transaction

* * * * *